(12) United States Patent
Cuvillier et al.

(10) Patent No.: US 10,837,317 B2
(45) Date of Patent: Nov. 17, 2020

(54) TURBOFAN COMPRISING A SIMPLIFIED BEARING LUBRICATION ASSEMBLY

(71) Applicant: Safran Aircraft Engines, Paris (FR)

(72) Inventors: Romain Guillaume Cuvillier, Moissy-Cramayel (FR); Nils Edouard Romain Bordoni, Moissy-Cramayel (FR); Michel Gilbert Roland Brault, Moissy-Cramayel (FR); Sebastien Christophe Chalaud, Moissy-Cramayel (FR); Guillaume Patrice Kubiak, Moissy-Cramayel (FR); Arnaud Nicolas Negri, Moissy-Cramayel (FR); Nathalie Nowakowski, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 148 days.

(21) Appl. No.: 16/085,394

(22) PCT Filed: Mar. 15, 2017

(86) PCT No.: PCT/FR2017/050600
§ 371 (c)(1),
(2) Date: Sep. 14, 2018

(87) PCT Pub. No.: WO2017/158298
PCT Pub. Date: Sep. 21, 2017

(65) Prior Publication Data
US 2019/0101081 A1     Apr. 4, 2019

(30) Foreign Application Priority Data

Mar. 15, 2016 (FR) .................................. 16 52170

(51) Int. Cl.
*F01D 25/18* (2006.01)
*F01D 25/20* (2006.01)
(Continued)

(52) U.S. Cl.
CPC ............. *F01D 25/18* (2013.01); *F01D 25/20* (2013.01); *F02C 7/06* (2013.01); *F02C 7/36* (2013.01);
(Continued)

(58) Field of Classification Search
CPC ........ F01D 25/162; F01D 25/18; F01D 25/20; F02K 3/06; F02C 7/06; F02C 7/36;
(Continued)

(56) References Cited

U.S. PATENT DOCUMENTS 4,531,358 A * 7/1985 Smith ................... F01D 25/20
                                                   184/6.11
8,402,741 B1 * 3/2013 Merry ................... F01D 25/16
                                                   60/226.1

(Continued)

FOREIGN PATENT DOCUMENTS

| EP | 0 513 957 A1 | 11/1992 |
| FR | 2 925 110 A1 | 6/2009 |
| FR | 2 977 277 A1 | 1/2013 |

OTHER PUBLICATIONS

French Search Report dated Nov. 22, 2016 in French Patent Application No. 1652170 (with English translation of Category of Cited Documents), 9 pages.

(Continued)

*Primary Examiner* — Brian P Wolcott
(74) *Attorney, Agent, or Firm* — Oblon, McClelland, Maier & Neustadt, L.L.P.

(57) ABSTRACT

A bypass turbojet engine including a low pressure shaft supported by at least two low pressure bearings, a high pressure shaft supported by at least two high pressure bearings, a fan shaft supported by at least two fan bearings, a reduction system coupling the low pressure shaft, with the fan shaft, enclosures housing the low pressure bearings, the (Continued)

high pressure bearings, the fan bearings and the reduction system, and a lubrication assembly including a closed oil circuit configured to supply oil to the enclosures in order to cool the bearings and the reduction system and at most five recovery pumps configured to recover oil from the enclosures.

20 Claims, 19 Drawing Sheets

(51) Int. Cl.
  *F02C 7/36* (2006.01)
  *F02K 3/06* (2006.01)
  *F02C 7/06* (2006.01)
(52) U.S. Cl.
  CPC ............ *F02K 3/06* (2013.01); *F05D 2240/50* (2013.01); *F05D 2260/40311* (2013.01); *F05D 2260/98* (2013.01)
(58) Field of Classification Search
  CPC ....... F05D 2260/98; F05D 2260/40311; F05D 2240/50
  See application file for complete search history.

(56) References Cited

U.S. PATENT DOCUMENTS

| | | | |
|---|---|---|---|
| 8,672,095 B2* | 3/2014 | Charier | F01D 25/125 |
| | | | 184/6.23 |
| 9,849,411 B2* | 12/2017 | Sheridan | F01D 25/20 |
| 10,094,278 B2* | 10/2018 | Sheridan | F02C 3/06 |
| 10,502,081 B2* | 12/2019 | Bioud | F01D 11/04 |
| 2015/0176493 A1* | 6/2015 | Munsell | F01D 25/16 |
| | | | 415/175 |
| 2015/0343346 A1 | 12/2015 | Sheridan | |
| 2015/0369128 A1 | 12/2015 | Parnin et al. | |
| 2017/0218975 A1* | 8/2017 | Bintz | F02K 1/72 |

OTHER PUBLICATIONS

International Search Report dated May 24, 2017, in PCT/FR2017/050600 filed Mar. 15, 2017.

* cited by examiner

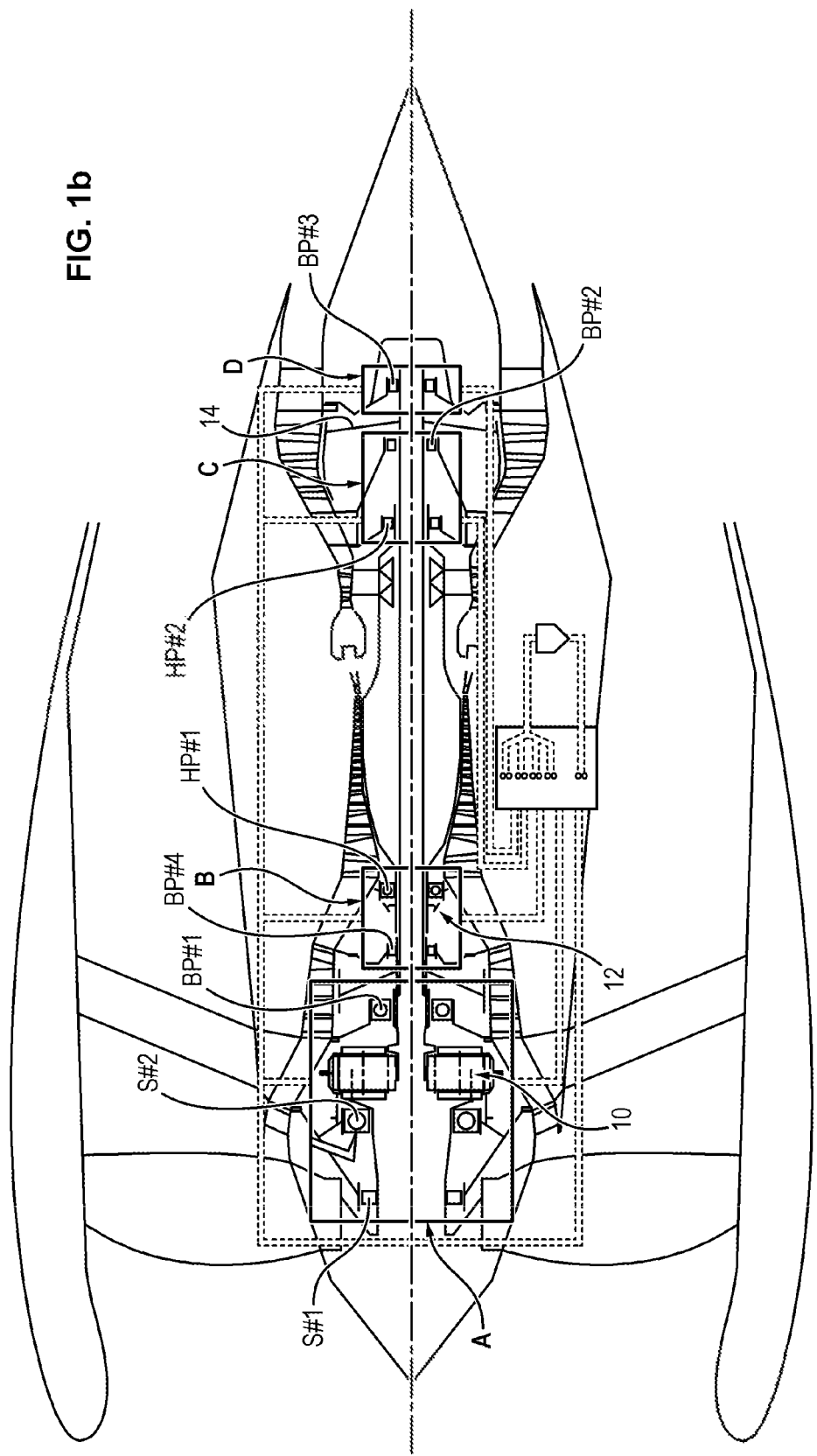

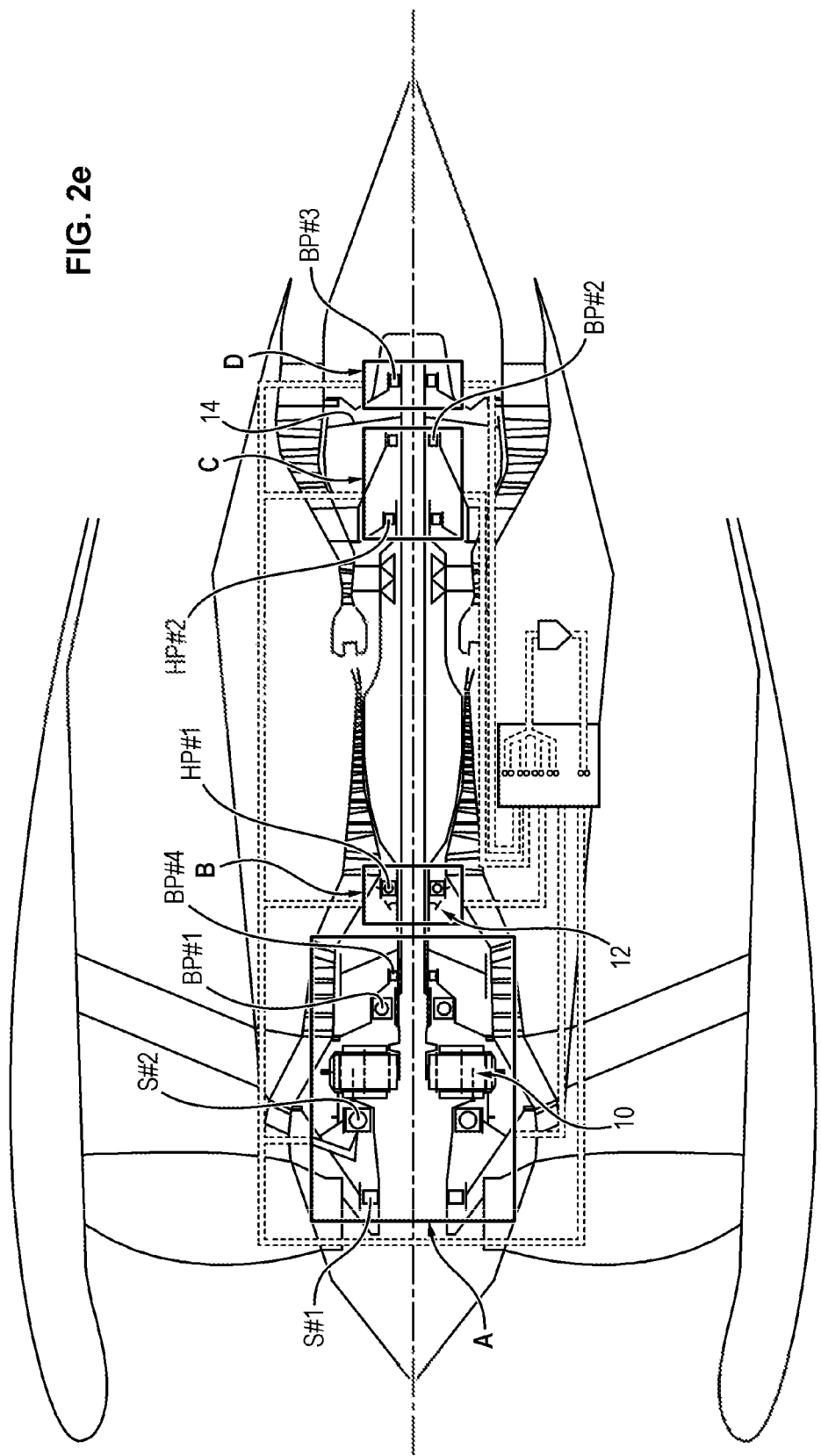

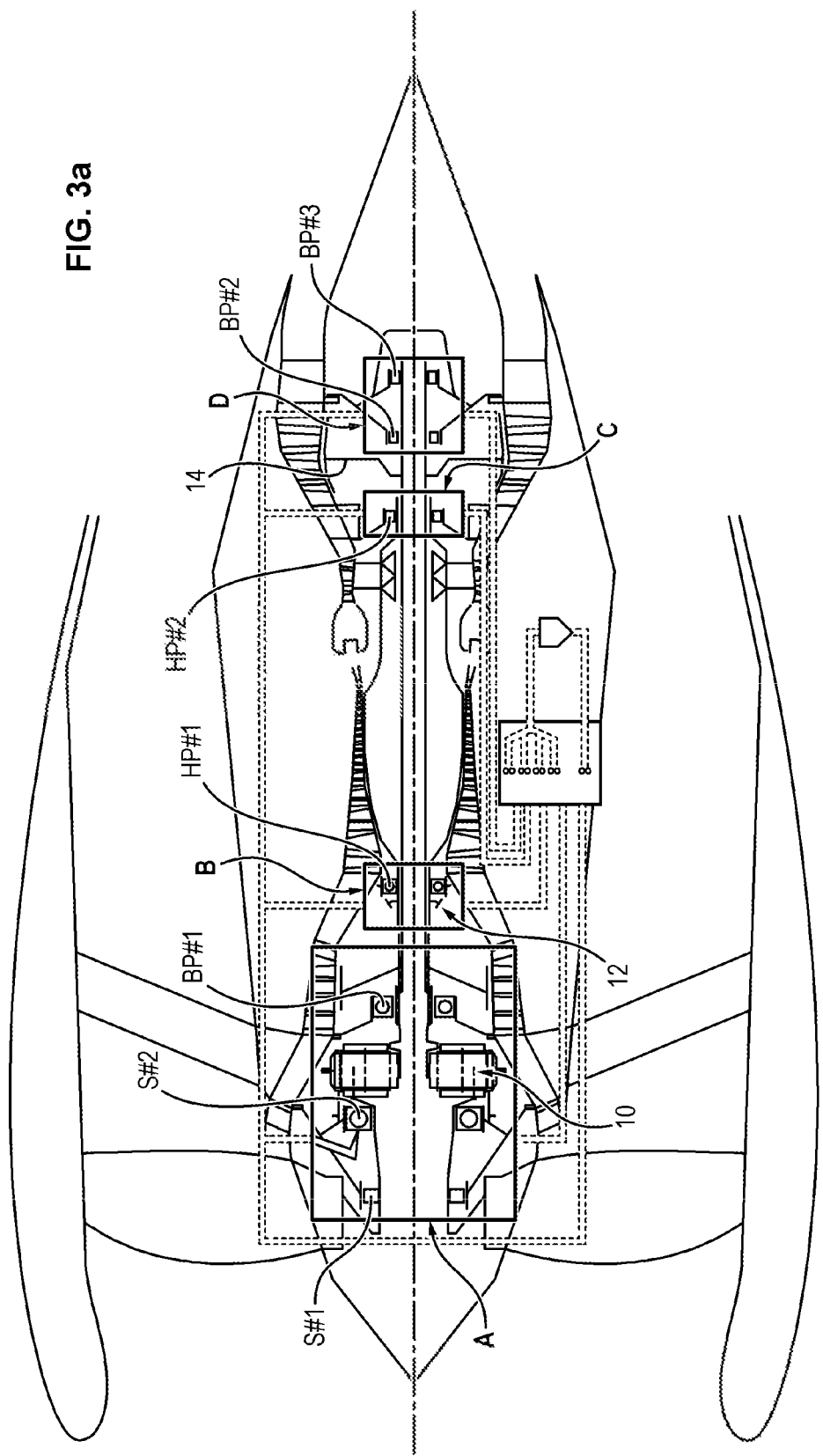

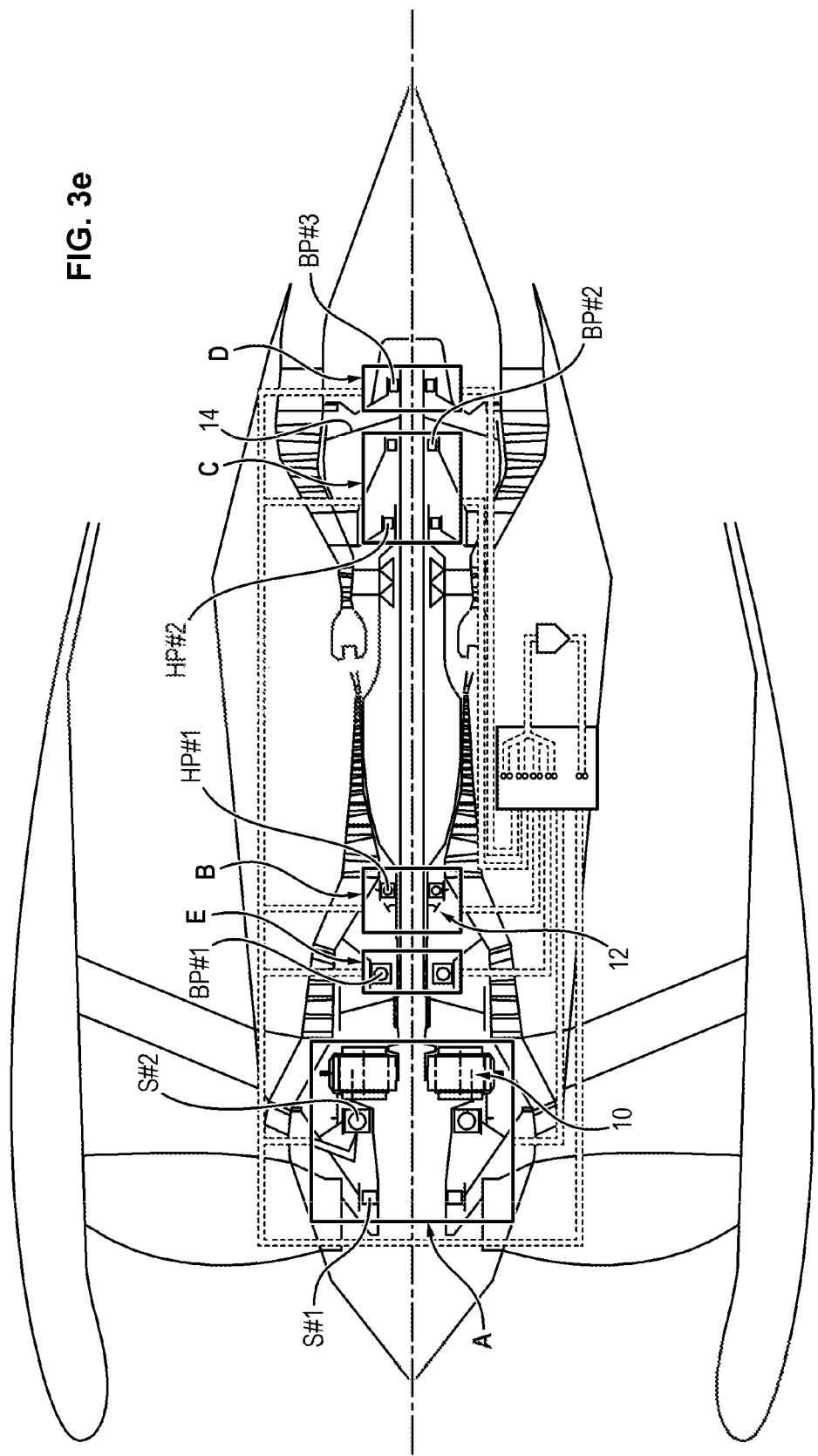

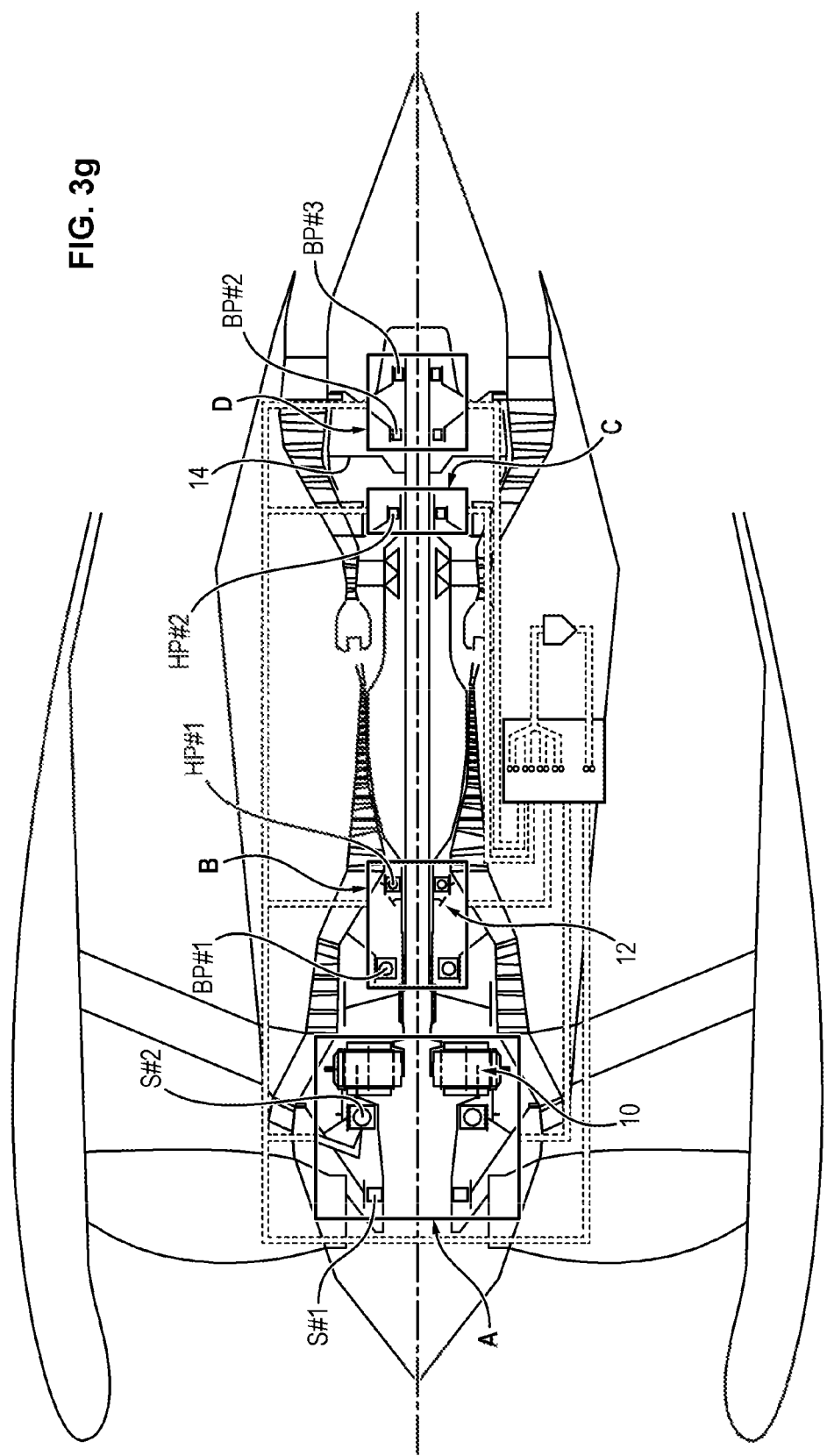

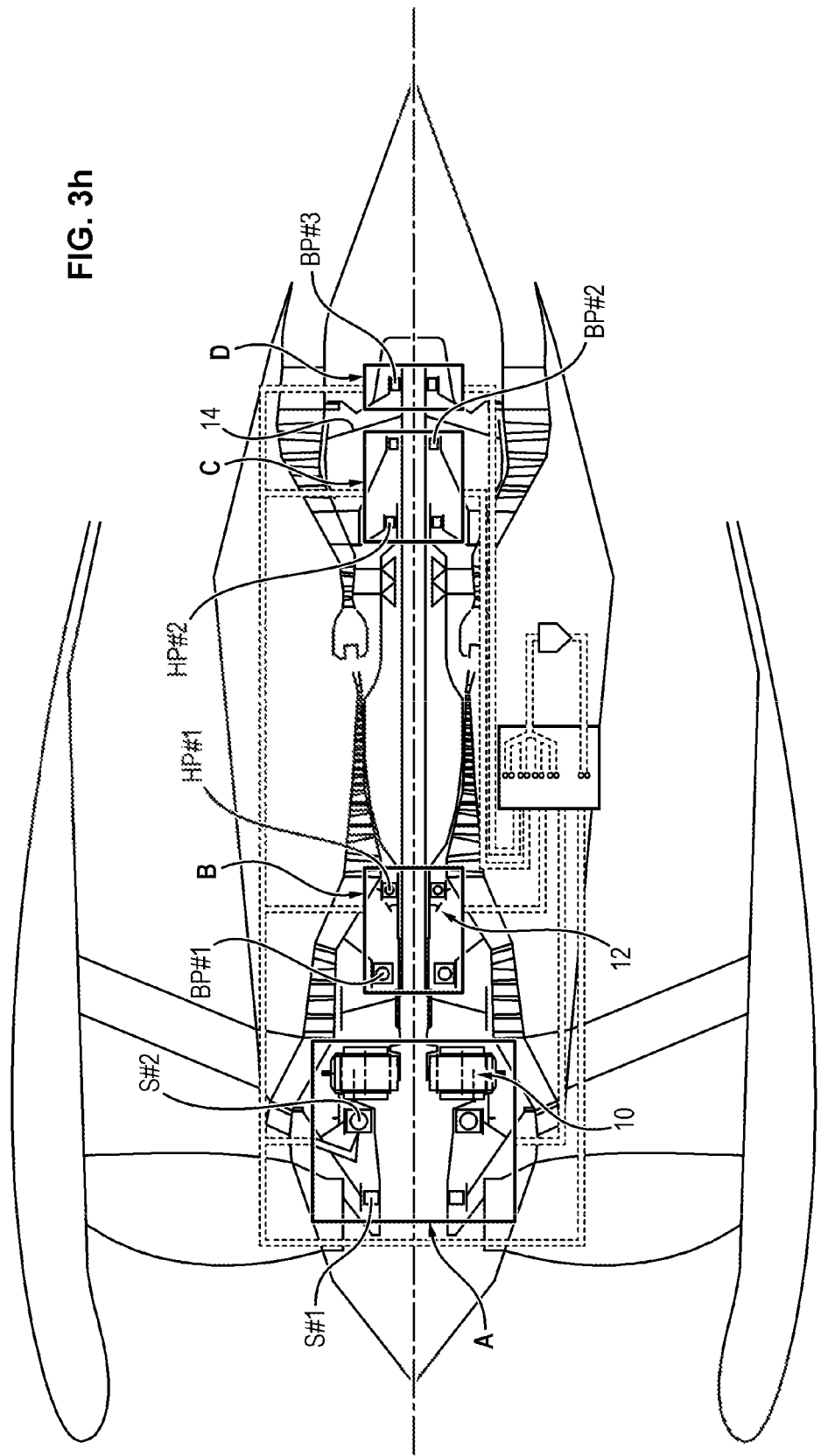

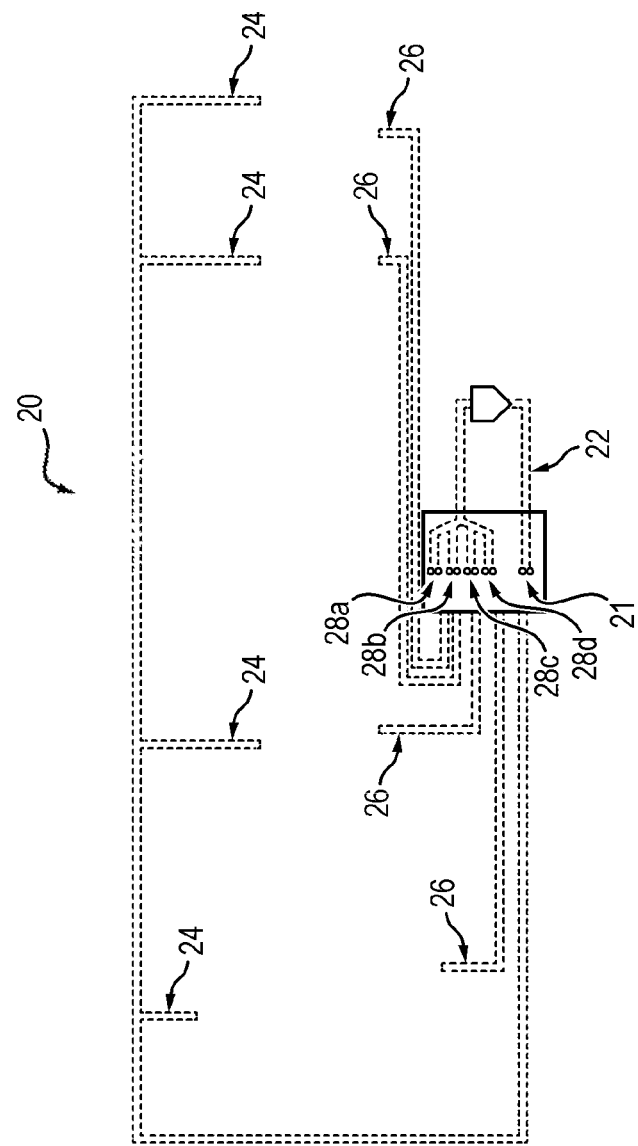

TURBOFAN COMPRISING A SIMPLIFIED BEARING LUBRICATION ASSEMBLY

FIELD OF THE INVENTION

The invention relates to the general field of turbofan engines, and more particularly turbomachines laving a high bypass ratio.

TECHNICAL BACKGROUND

A turbofan generally comprises, from upstream to downstream in the gas flow direction, a ducted fan housed in a fan casing, an annular primary flow space and an annular secondary flow space. The air mass suctioned by the fan is therefore divided into a primary flow, which circulates in the primary flow space, and a secondary flow, which is concentric with the primary flow and circulates in the secondary flow space.

The primary flow space passes through a primary body comprising one or more compressor stages, for example a low-pressure compressor and a high-pressure compressor, a combustion chamber, one or more turbine stages, for example a high-pressure turbine and a low-pressure turbine, and a gas exhaust nozzle.

Typically, the high-pressure turbine drives the high-pressure compressor in rotation by means of a first shaft, called high-pressure shaft, while the low-pressure turbine drives the low-pressure compressor in rotation and the fan by means of a second shaft, called low-pressure shaft. The low-pressure shaft is generally housed in the high-pressure shaft, said shafts being attached to the structural parts of the turbofan by means of bearings.

To improve the propulsive efficiency of the turbofan and reduce its specific fuel consumption as well, as the noise emitted by the fan, turbofans have been proposed having a high bypass ratio, which corresponds to the ratio between the secondary (cold) gas flow rate and the flow rate of the primary (hot, passing through the primary body) flow rate.

To achieve such bypass ratios, the fan is decoupled from the low pressure turbine, thus allowing their respective rotation speeds to be independently optimized. For example, decoupling can be accomplished by means of a reduction gear such as a planetary gear reduction mechanism or a star gear reduction mechanism, placed between the upstream end (with respect to the gas flow direction in the turbofan) of the low-pressure shaft and the fan. The fan is then driven by the low-pressure shaft by means of the reduction mechanism and a supplementary shaft, called fan shaft, which is attached between the reduction mechanism and the fan disk.

This decoupling allows a reduction in the rotation speed and the fan pressure ratio, and an increase in the power extracted by the low-pressure turbine. Thanks to the reduction mechanism, the low-pressure shaft can rotate at higher rotation speeds than in conventional turbofans.

The high-pressure shaft is attached to the structural parts of the engine by means of a front bearing HP#1 and a rear bearing HP#2. The front bearing HP#1 is usually mounted on the high-pressure shaft and on the casing that connects the low-pressure compressor and the high pressure compressor (inter-compressor casing). The rear bearing HP#2, for its part, is mounted on the one hand on the high-pressure shaft and on the other hand on the inter-turbine casing (i.e. on the casing extending between the casing housing the high-pressure turbine and the casing housing the low-pressure turbine).

A third high-pressure bearing can be provided between the front bearing HP#1 and the rear bearing HP#2 if needed. The third high-pressure front bearing preferably extends upstream of a combustion chamber of the turbofan 1.

The low-pressure shaft is generally supported by three bearing BP#1, BP#2 and BP#3. The first bearing BP#1 is located farthest upstream from the low-pressure shaft and can be mounted, on the one hand, on the low-pressure shaft and on the other hand between the reduction mechanism and the booster 3 (on the "inlet" casing). The third bearing BP#3, which is located farthest downstream from the low-pressure shaft, can be mounted on the low-pressure shaft and on the exhaust casing of the turbofan. The position of the bearings BP#1 and BP#3 being conventional, it will not be further detailed hereafter.

The second bearing BP#2, which is adjacent to the third bearing BP#3, can be mounted on the low-pressure shaft and on the inter-turbine casing upstream of the low-pressure turbine, or on the exhaust casing like bearing BP#3. In one embodiment, the second bearing BP#2 extends downstream of the rear bearing HP#2.

The fan shaft, which is mounted between the output of the reduction mechanism and the fan rotor, is further supported by an upstream bearing S#1 disposed underneath the fan and a downstream bearing S#2 disposed at the inlet of the secondary flow space, upstream of the reduction mechanism.

The turbofan further comprises a gear set configured to collect power from the high-pressure shaft. This gear set is generally placed upstream of the front bearing HP#1.

These different bearings, the reduction mechanism and the gear set must be lubricated and cooled. To this end, the turbofan generally comprises a lubrication assembly supplying a closed oil circuit, enclosures in which the bearings, the reduction mechanism and the gear set are housed, configured to inject oil into the enclosures and recovery pumps configured to recycle the oil which was injected into the enclosures.

To this end, each enclosure comprises rollers interleaved between an inner ring and an outer ring coaxial with the axis X of the turbofan and substantially annular. The outer ring can be fixed with respect to the structural elements of the turbofan, while the inner ring is fixed on rotating parts of the turbofan and is therefore movable in rotation around its axis X. As a variant, both rings are rotating. The equipment housed in the enclosures is lubricated and cooled by oil which is projected into the enclosure by the spray nozzles to form a fog of droplets in suspension. Sealing means are provided in the zones where the rings join to allow the passage of airflow for the purpose of pressurizing the enclosure and retaining as much oil as possible inside it. Furthermore, one oil recovery pump is provided to discharge a volume of oil equivalent to that which is injected into the enclosure via spray nozzles.

Such a configuration thus allows effectively lubricating and cooling, these pieces of equipment. However, the enclosures and the recovery pumps have a non negligible impact on the bulk and the weight of the engine, thus increasing the specific fuel consumption of the turbofan.

SUMMARY OF THE INVENTION

One objective of the invention is therefore to propose a turbofan which has a reduced mass by comparison with conventional turbofans, while still ensuring optimal lubrication and cooling of its equipment, such as bearings and, if required, its reduction mechanism and avoiding the risk of oil retention.

To this end, the invention, proposes a turbofan comprising:
- a low-pressure shaft supported by at least two low-pressure bearings,
- a high-pressure shaft supported by at least two high-pressure bearings,
- a fan shaft supported by at least two fan bearings,
- a reduction mechanism, coupling the low-pressure shaft and the fan shaft,
- enclosures housing the low-pressure bearings, the high-pressure bearings, the fan bearings and the reduction mechanism, and
- a lubrication assembly comprising a closed oil circuit configured to supply the enclosures with oil to cool said bearings and the reduction mechanism, said lubrication assembly comprising at most five recovery pumps configured to recover oil in the enclosures.

Certain preferred but non-limiting features of the turbofan described above are the following, taken individually or in combination:
- the turbofan comprises at most four recovery pumps configured to recover oil in the enclosures,
- the turbofan comprises at most as many recovery pumps as enclosures, each recovery pump being associated with at most one respective enclosure,
- the fan bearings, the reduction mechanism and at least one of the low-pressure bearings are housed in the same enclosure, and wherein a single recovery pump is configured to recover oil injected into said enclosure,
- the other low-pressure bearings, the high-pressure bearings and the fan bearings are housed in at most four enclosures, and wherein the lubrication assembly comprises exactly three or four recovery pumps configured to recover oil injected into said four enclosures,
- only one of the recovery pumps of the lubrication assembly is configured to recover oil in the enclosure or the enclosures housing the fan bearings, the reduction mechanism and one of the low-pressure bearing.
- the high-pressure bearings comprise a front high-pressure bearing and a rear high-pressure bearing, the low-pressure bearings comprise a front low-pressure bearing and a rear low-pressure bearing, the lubrication assembly comprising a recovery pump configured to recover oil in the enclosure housing the rear high-pressure bearing and a recovery pump configured to recover oil in the enclosure housing the rear low pressure bearing. Optionally the lubrication assembly comprises a recovery pump configured to recover oil in the enclosure housing the front high-pressure bearing and a recovery pump configured to recover oil in the enclosure housing the reduction mechanism,
- the high-pressure bearings comprise a front high-pressure bearing and a rear high-pressure bearing, the low-pressure bearings comprise a front low-pressure bearing and a rear low-pressure bearing, only one of the recovery pumps of the lubrication assembly being configured to recover oil in the enclosure or the enclosures housing the rear high-pressure bearing and the rear low-pressure bearing. Optionally the lubrication assembly comprises a recovery pump configured to recover oil in the enclosure housing the front high-pressure bearing and a recovery pump configured to recover oil in the enclosure housing the reduction mechanism.
- the low-pressure shaft is supported by at least three low-pressure bearings, a first and a second of said low-pressure bearings being placed between the fan bearings and the high-pressure bearings,
or a single recovery pump of the recovery assembly is configured to recover oil in the enclosure or the enclosures housing the reduction mechanism and the second low-pressure bearing, or a single recovery pump of the recovery assembly is configured to recover oil in the enclosure or the enclosures housing one of the high-pressure bearings and the second low-pressure bearing,
- the low-pressure shaft is supported, by four low-pressure bearings, a first and a second of the low-pressure bearings being placed between the fan bearings and the high-pressure bearings while a third and a fourth of the low-pressure bearings are placed downstream of the high-pressure bearings, the upstream and the downstream being defined in a gas flow direction in the turbofan. Optionally exactly three recovery pumps of the lubrication assembly are configured to, recover oil in the enclosures housing respectively the third low-pressure bearing, the fourth low-pressure bearing and the high-pressure bearings,
- the high-pressure bearings comprise a front high-pressure bearing and a rear high-pressure bearing, the low-pressure bearings comprise a first, a second and a third low-pressure bearing, and wherein the enclosure of the rear high-pressure bearing, the enclosure of the third low-pressure bearing and the enclosure of the fourth low-pressure bearing are not vented,
- the high-pressure bearings comprise two front high-pressure bearings, placed upstream of a combustion chamber, and a rear high-pressure bearing, placed downstream of the combustion chamber, the front high-pressure bearing being housed in the same enclosure and associated with the same recovery pump,
- the low-pressure bearings comprise exactly three or four low-pressure bearings, including one or two low-pressure bearings placed upstream of a combustion chamber, and one or two low-pressure bearings placed downstream of the combustion chamber,
- the turbofan has a bypass ratio greater than or equal to 10, preferably greater than or equal to 18, for example between 12 and 18, and/or
- the reduction mechanism comprises a star or planetary gear reduction mechanism having a reduction ratio between 2.6 and 5.

BRIEF DESCRIPTION OF THE DRAWINGS

Other features, aims and advantages of the present invention will appear more clearly upon reading the detailed description that follows, and with reference to the appended drawings given by way of non-limiting example and in which:

FIG. 4 is a schematic view illustrating an embodiment of a lubrication assembly which can be implemented in a turbofan according to the invention, and especially in those embodiments in which the lubrication assembly comprises exactly four recovery pumps.

DETAILED DESCRIPTION OF AN EMBODIMENT

Figure 1A:
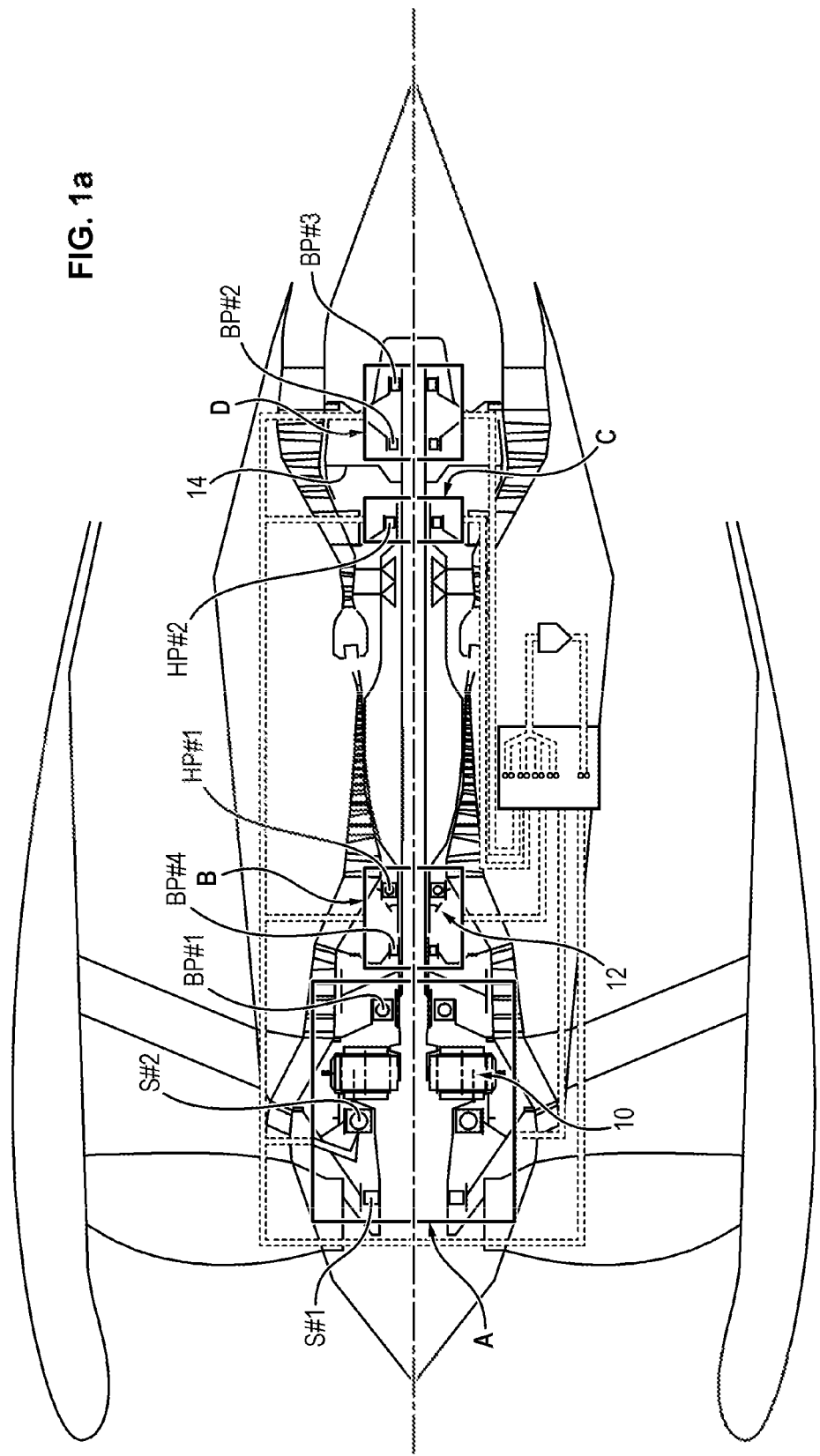
FIGS. 1a to 3i are schematic views and sectional views of embodiments of a turbofan according to the invention.

Hereafter, a turbofan will at present be described with reference to the appended figures.

The turbofan 1 comprises, conventionally, a fan 2 and a primary body. The primary body comprises, in the gas flow direction, a low-pressure compressor 3 (booster), a high-pressure compressor 4, a combustion chamber 5, a high-pressure turbine 6, a low-pressure turbine 7 and a gas exhaust nozzle 8.

The fan 2 comprises a fan disk provided with fan blades at its periphery which, when they are put into rotation, drive the airflow in the primary and secondary flow spaces of the turbofan 1. The fan disk is driven in rotation by a low-pressure shaft 6a of the low-pressure turbine 7.

In one embodiment, the turbofan 1 has a high bypass ratio. By high bypass ratio is meant here a bypass ratio greater than 10, for example comprised between 12 and 18. To this end, the fan 2 is decoupled from the low-pressure turbine 7 to independently optimize their respective rotation speed, for example by means of a reduction mechanism 10 of the planetary or star gear type, placed between the upstream end (with respect to the gas flow direction in the turbofan 1) of the low-pressure shaft ea and the fan 2.

The fan 2 is then driven by the low-pressure shaft 6a by means of the reduction mechanism 10 and a fan shaft 2a, which is attached between the reduction mechanism 10 and the fan disk.

To calculate the bypass ratio, the flow rate of the secondary flow and the flow rate of the primary flow are measured when the turbofan 1 is stationary in a standard atmosphere (as defined by the manual of the International Civil Aviation Organization (ICAO), Doc 7488/3, $3^{rd}$ edition) and at sea level.

In one embodiment, the reduction mechanism 10 comprises a star or planetary gear reduction mechanism 10.

The reduction ratio of the reduction mechanism 10 is preferably between 2.6 and 5.

The diameter of the fan 2 can be between eighty inches (203.2 centimeters) and one hundred and ten inches (279.4 centimeters), preferably between eighty inches (203.2 centimeters) and ninety inches (228.6 centimeters).

The fan shaft 2a, the high-pressure shaft 7a and the low-pressure shaft 6a are centred on the axis X of the turbofan 1 by a series of bearings.

In this case, the fan shaft 2a is supported by the upstream bearing S#1 and the downstream bearing S#2, the high-pressure shaft 7a is supported by the front bearing HP#1, the rear bearing HP#2 and if needed a third high-pressure bearing, while the low-pressure shaft 6a is supported by the three bearings BP#1, BP#2 and BP#3. Since these seven or even eight bearings are conventional and have been described previously, they will not be detailed further here.

In one embodiment illustrated in FIGS. 1a to 2f, the low pressure shaft 6a can also be supported by a fourth bearing BP#4, placed between the first bearing BP#1, which is the bearing farthest upstream of the low pressure shaft 6a, and the front bearing HP#1 of the high-pressure shaft 7a. This fourth bearing BP#4 can especially be mounted on the low pressure shaft 6a and on the inter-compressor casing, or between the casing housing the booster 3 and the casing housing the high-pressure compressor 4.

The mounting of the low-pressure shaft 6a an four bearings BP#1 to BP#4 allows the effective displacement of the displacement modes of the low-pressure shaft 6a, which is supercritical (that is with a flexural mode in the operating range), so as to position the flexural modes in the transient operating range of the turbofan 1 with safety margins compared with stabilized operating points. By stabilized operating point is meant here an operating point defined by a spectrum of rotation speeds of the low pressure shaft 6a in which the turbofan 1 can be placed and retained for a relatively long time (comprised between a few minutes and several hours). Examples of stabilized operating points comprise in particular ground idle, flight idle, cruise, or, even takeoff. By transient operating point is meant here an operating point corresponding to the passage from one stabilized operating point to another in which the speed of rotation of the low-pressure shaft 6a varies rapidly. In fact, the stabilized operating points do not cover the entire spectrum between idle and redline (a term designating the absolute maximum speed encountered by the low-pressure shaft 6a during the entire flight), so that it may be necessary, depending on stabilized operating point to be attained, to pass through a transient operating point to attain this stabilized operating point.

Thus, thanks to the addition of the low-pressure bearing BP#4, the first flexural mode of the low-pressure shaft 6a is displaced to approximately 8000 rpm, hence between the ground idle operating point (which corresponds to a speed of rotation of the low-pressure shaft 6a of 2000 to 4500 rpm and the cruise operating point (which corresponds to a speed of rotation of the low-pressure shaft 6a of 8500 to 9500 rpm) for a turbofan 1 having a redline comprised between 10,000 rpm and 12,000 rpm.

It further becomes possible to reduce the diameter of the low-pressure shaft 6a and hence the bulk of the primary body to attain, with the reduction mechanism 10 and the considerable diameter of the fan 2, a high bypass ratio for the turbofan 1. Typically, the low-pressure shaft 6a can have an outer diameter less than fifty millimeters, for example less than forty-five millimeters.

This positioning of the bearings also allows a reduction of the use of clearances (radial displacements) of the booster 3, this currently being placed between two bearings BP#1 and BP#4.

The turbofan 1 further generally comprises a gear set 12 configured to collect power on the high-pressure shaft. Here, this is a gear set using a conical gear connected to a radial shaft. This gear set is generally placed upstream of the front bearing HP#1.

The turbofan 1 comprises a lubrication assembly 20 conventionally comprising a tank 22 containing oil which is maintained by known, exchanger systems at a sufficiently low temperature to allow cooling of bearings and of the reduction mechanism 10. The lubrication assembly 20 comprises an oil circulation pump 21 and oil supply lines respectively in the enclosures A to D, where the oil is injected onto parts to be cooled by means of one or more spray nozzles 24. Recovery pipes 26 at output of the enclosures A to D ensure that oil fog is collected by way of recovery pumps 28a to 28d. The fog recovered on the different enclosures A to D terminates in the tank which comprises a de-oiler.

The spray nozzles 24 can be placed at the top of the enclosures A to D (the bottom and top being defined relative to the position occupied during normal flight of the turbofan 1), to the right of the associated bearings. The recovery pipes 26 as such are placed at the base of the enclosures A to D so as to recover oil by depression.

In one, embodiment, the lubrication assembly 20 of the turbofan 1 comprises at most five recovery pumps 28a to 28d, preferably at most four recovery pumps 28a to 28d, configured to recycle the oil which a been injected into the enclosures A to E. More precisely, the lubrication assembly 20 comprises exactly three, four or five recovery pumps 28a to 28d. The recovery pumps 28a to 28d can for example be housed in the body of the turbofan 1 with the tank 22, between the outer casing containing the primary body and the platform defining the inner surface of the secondary vein.

Similarly, the turbofan 1 comprises at most five enclosures A to E, configured to contain oil introduced by the spray nozzles 24 to lubricate and cool all the bearings and the reduction mechanism 10. More precisely, the turbofan 1 comprises one enclosure A to E per recovery pump 28a to 28d.

To this end, the two fan bearings S#1 and S#2 and the reduction mechanism 10, and optionally the low-pressure bearing BP#1, can be housed in the same enclosure A, A recovery pump 28a is then associated with this enclosure A. The other bearings can be housed in dedicated enclosures or, on the contrary, in several common enclosures, so as to reduce the number of enclosures necessary. It will be noted that for these other bearings, a maximum of one oil recovery pump per enclosure is necessary. Typically, the same single recovery pump can be used for two enclosures, or even three enclosures.

The number of recovery pumps 28a-28d and enclosures A to E is therefore strongly reduced in comparison with the prior art, which places each piece of equipment (bearings S#1, S#2, HP#1, HP#2, BP#1 to BP#4 or reduction mechanism 10) in an enclosure with a dedicated recovery pump. The lubrication circuit is, therefore greatly simplified due to reduction in the number of recovery pumps. The mass of the turbofan 1 is further greatly reduced, as too the radial bulk and the axial bulk resulting from the presence of the recovery pumps 28a to 28d and the enclosures A to E.

Each enclosure A to E comprises to this end an inner ring and an outer ring coaxial with the axis X of the turbofan 1 and substantially annular. The outer rind is attached relative to the structural elements of the turbofan 1 while the inner ring is attached on rotating parts of the turbofan 1 and is therefore mobile in rotation about its axis X. When the enclosure houses a bearing, the support of said bearing is therefore attached on the outer ring of the enclosure.

In the exemplary embodiments shown in FIGS. 1a to 2f, the turbofan 1 comprises two fan bearings S#1 and S#2, a reduction mechanism 10, two high-pressure bearings HP#1 and HP#2 and four low-pressure bearings BP#1, BP#2, BP#3 and BP#4.

The lubrication assembly 20 can comprise exactly three or four recovery pumps 28a to 28d. Each of the recovery pumps 28a to 28d is preferably associated with an enclosure A to D, the bearings (S#1, S#2, BP#1 to BP#4, HP#1 and HP#2) and the reduction mechanism 10 being distributed as follows in these three or four enclosures A to D.

In the embodiment illustrated in FIG. 1a, the turbofan 1 comprises at most four recovery pumps 28a to 28d, each recovery pump being associated with an enclosure A to D. Specifically:
  one enclosure A housing the two fan bearings S#1 and S#2, the reduction mechanism 10 and the low-pressure bearing BP#1
  one enclosure B housing the low-pressure bearing BP#4 and the front high-pressure bearing HP#1.
  one enclosure C housing the rear high-pressure bearing HP#2.
  one enclosure D housing the low-pressure bearings BP#2 and BP#3.

In this exemplary embodiment the lubrication assembly 20 therefore comprises:
  a recovery pump 28a configured to recover oil in the enclosure A which houses the two fan bearings S#1 and S#2, the reduction mechanism 10 and the low-pressure bearing BP#1,
  a recovery pump 28b configured to recover oil in the enclosure B which houses the low-pressure bearing BP#4 and the front high-pressure bearing HP#1,
  a recovery pump 28c configured to recover oil in the enclosure C which houses the rear high-pressure bearing HP#2, and
  a recovery pump 28d configured to recover oil in the enclosure D which houses the low-pressure bearings BP#2 and BP#3.

As a variant, the turbofan 1 could comprise exactly three recovery pumps, the recovery pump 28c being configured to recover oil in the enclosure C which houses the rear high-pressure bearing HP#2 and in the enclosure D which houses the low-pressure bearings BP#2 and BP#3. In this case, the recovery pump 28d is omitted.

The exemplary embodiment illustrated in FIG. 1b is identical to that illustrated in FIG. 1a, except that the low-pressure bearing BP#2 is placed in the enclosure C. As for FIG. 1a, the same recovery pump 28c can be used for recovering oil in the enclosures C and D, the turbofan 1 comprising only three recovery pumps 28a to 28c.

Figure 1C:
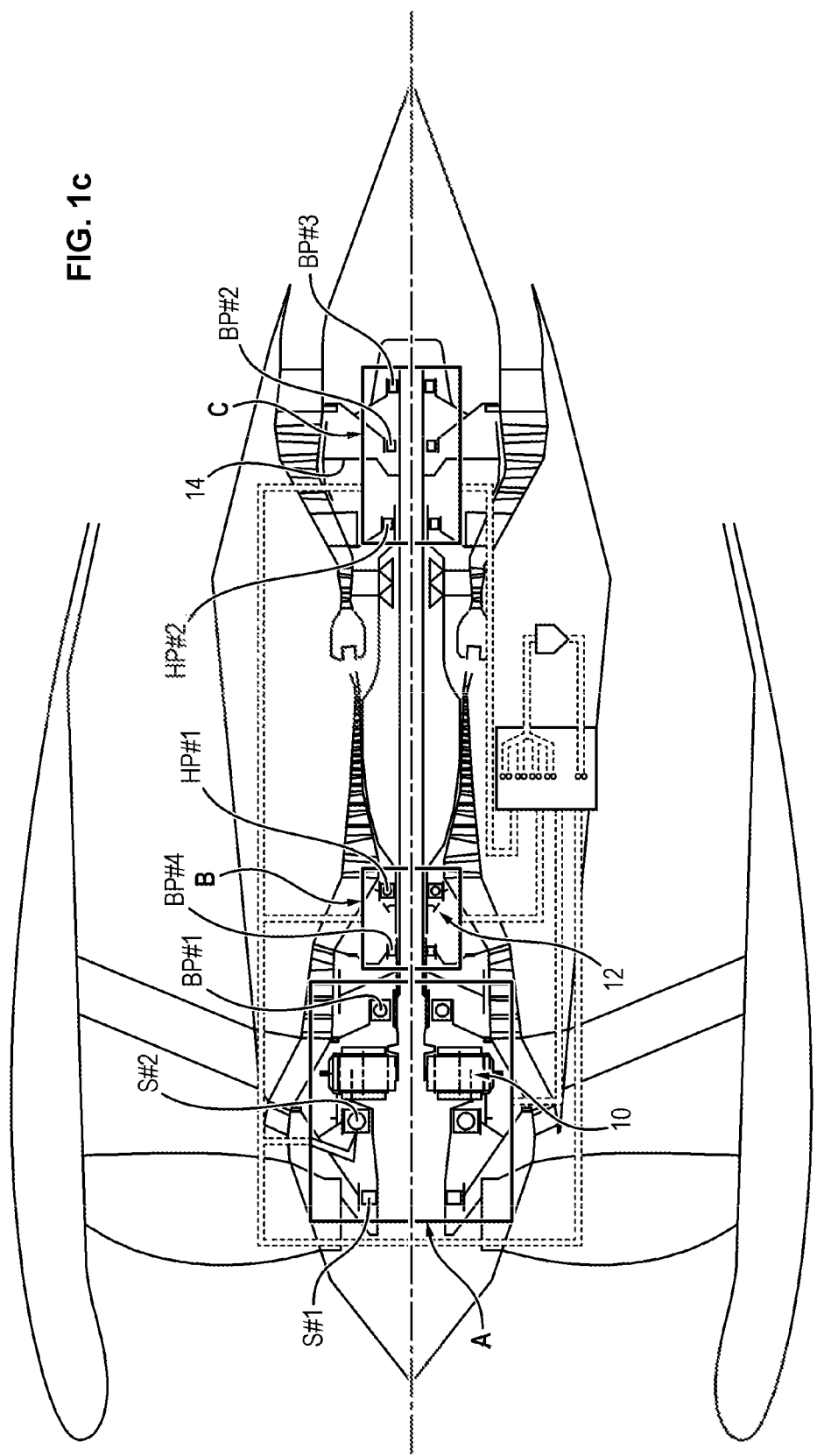

The exemplary embodiment illustrated in FIG. 1c is identical to that illustrated in FIG. 1a, except that the turbofan 1 comprises the enclosures B and C only, the enclosure C housing the rear high-pressure bearing HP#2 and the low-pressure bearings BP#2 and BP#3. In this exemplary embodiment, the turbofan 1 therefore comprises three recovery pumps 28a. 28b and 28c exactly, specifically a recovery pump 28a to 28c by enclosure A to C (respectively).

In an exemplary embodiment not illustrated in the figures, the turbofan 1 comprises five enclosures. A first enclosure A houses the two fan bearings S#1 and S#2, the reduction mechanism 10 and the low-pressure bearing BP#1. A second enclosure B houses the low-pressure bearing BP#4 and the front high-pressure bearing HP#1. A third, a fourth and a fifth enclosure respectively house the rear high-pressure bearing HP#2, the second low-pressure bearing BP#2 and the third low-pressure bearing BP#3. In this case, the turbofan 1 comprises at most five recovery pumps (specifically at most a pump by enclosure). In this way, the turbofan 1 can comprise a recovery pump for the first enclosure, a recovery pump for the second enclosure, and between one and three recovery pumps for the third, the fourth and the fifth enclosure.

Figure 2A:
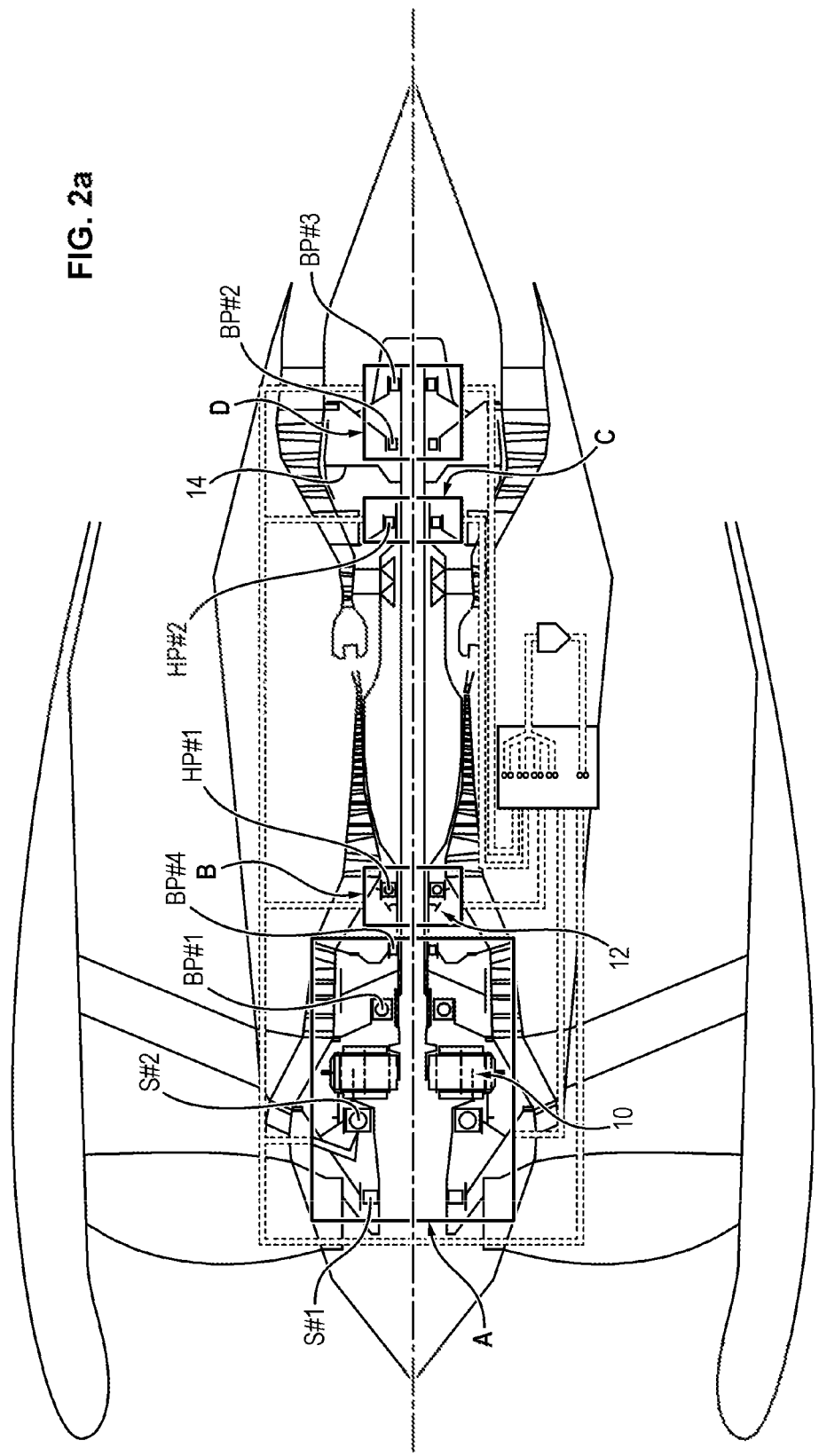
Figure 2B:
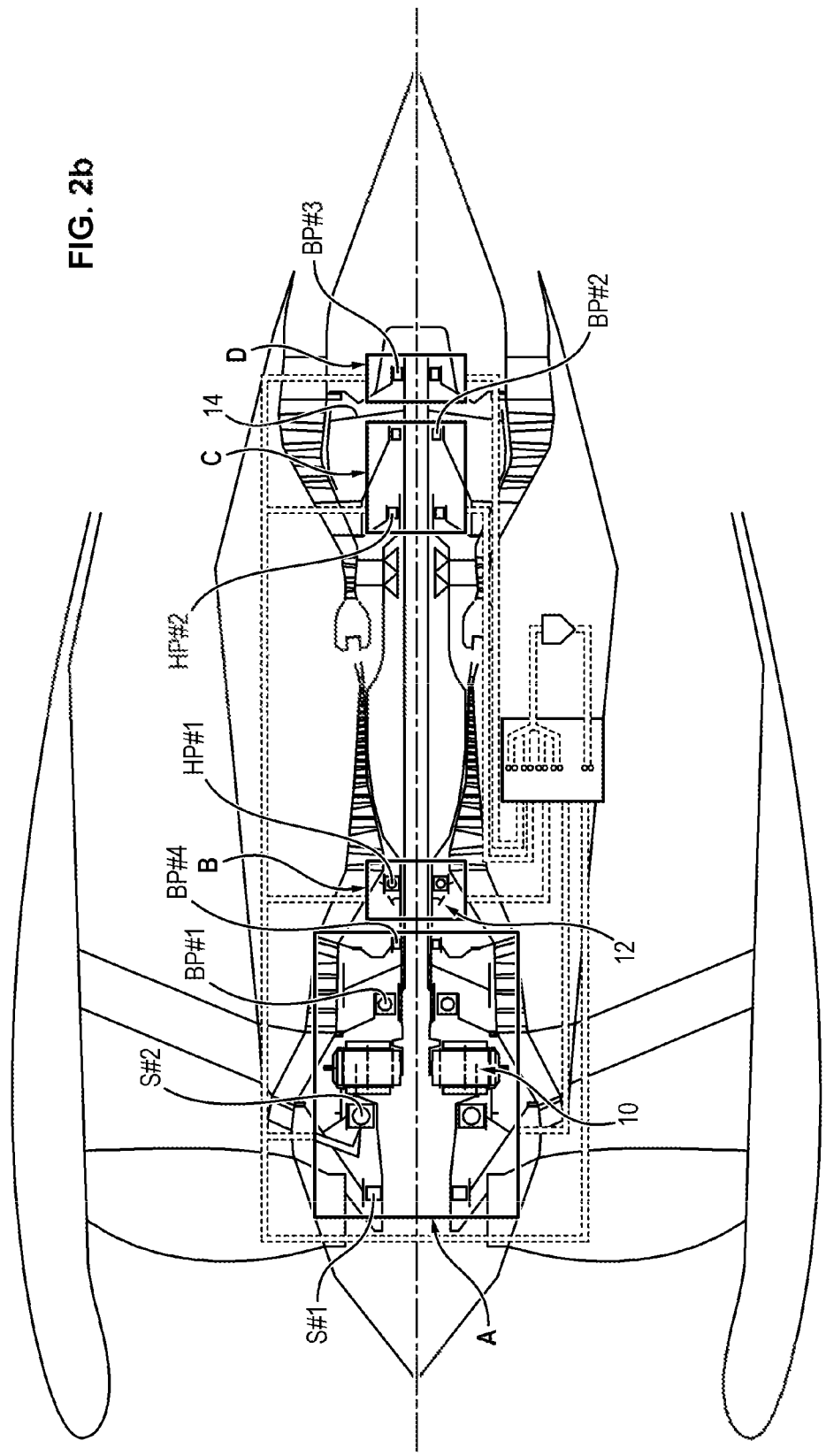
Figure 2C:
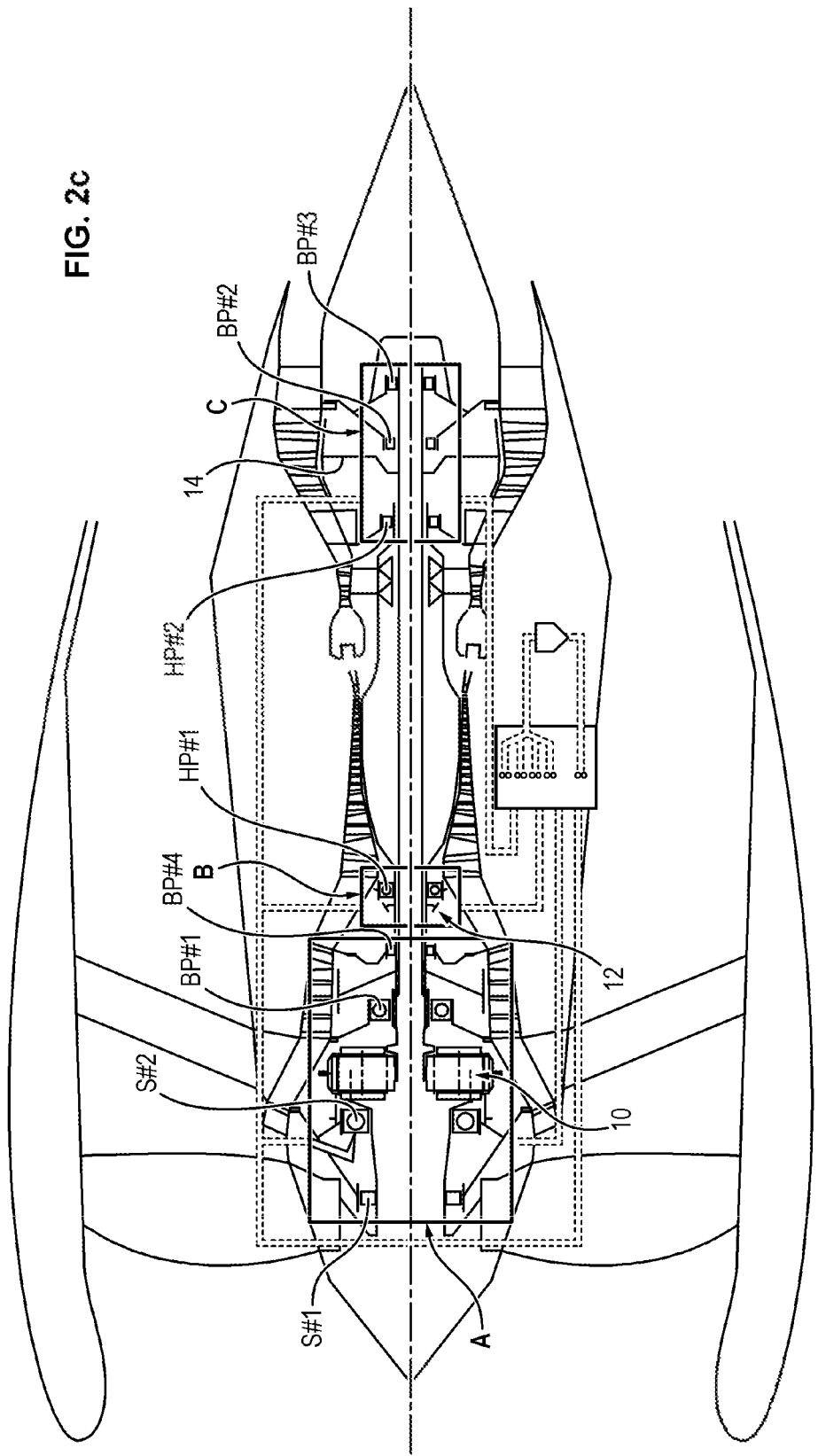
Figure 2D:
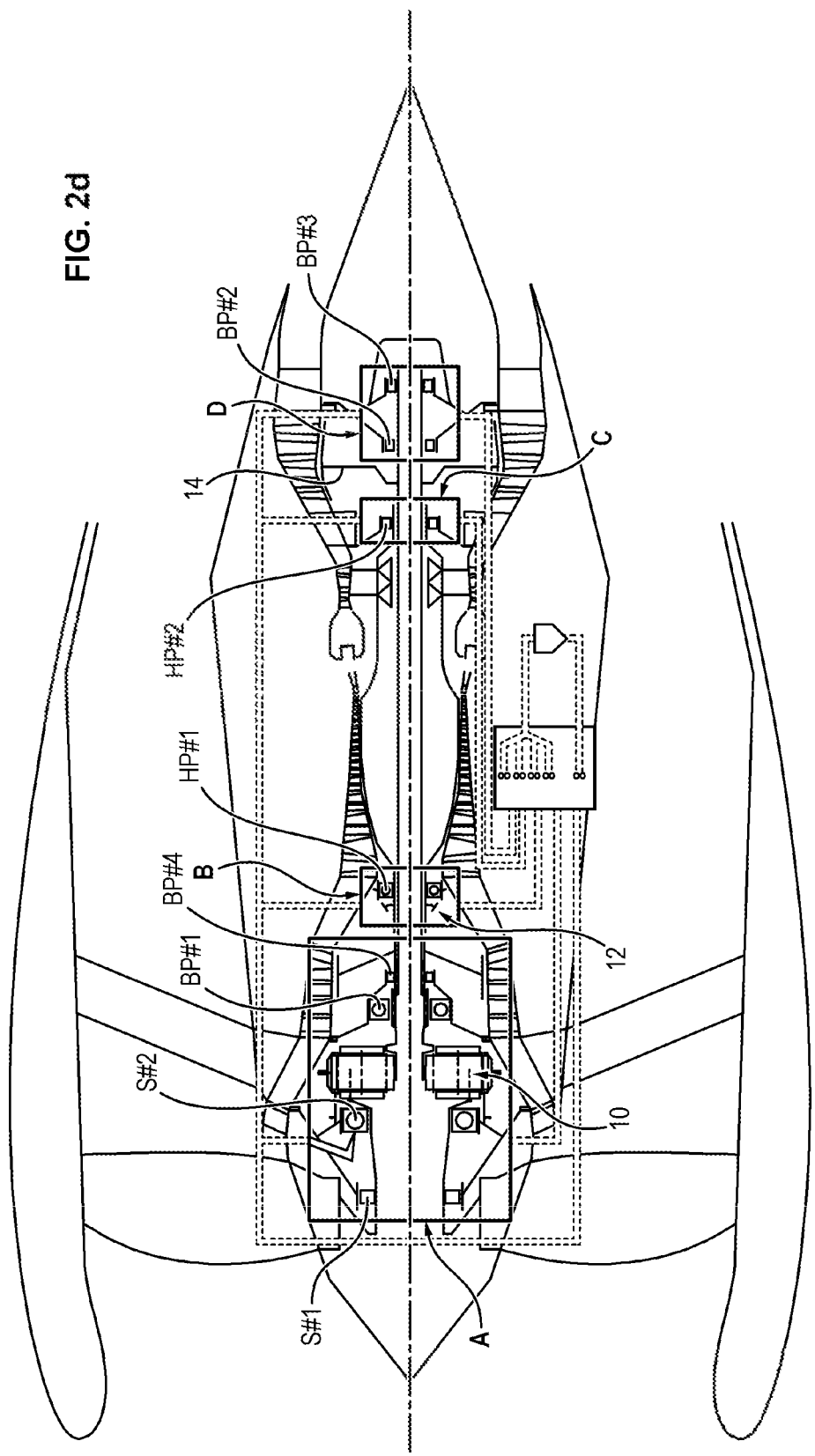
Figure 2F:
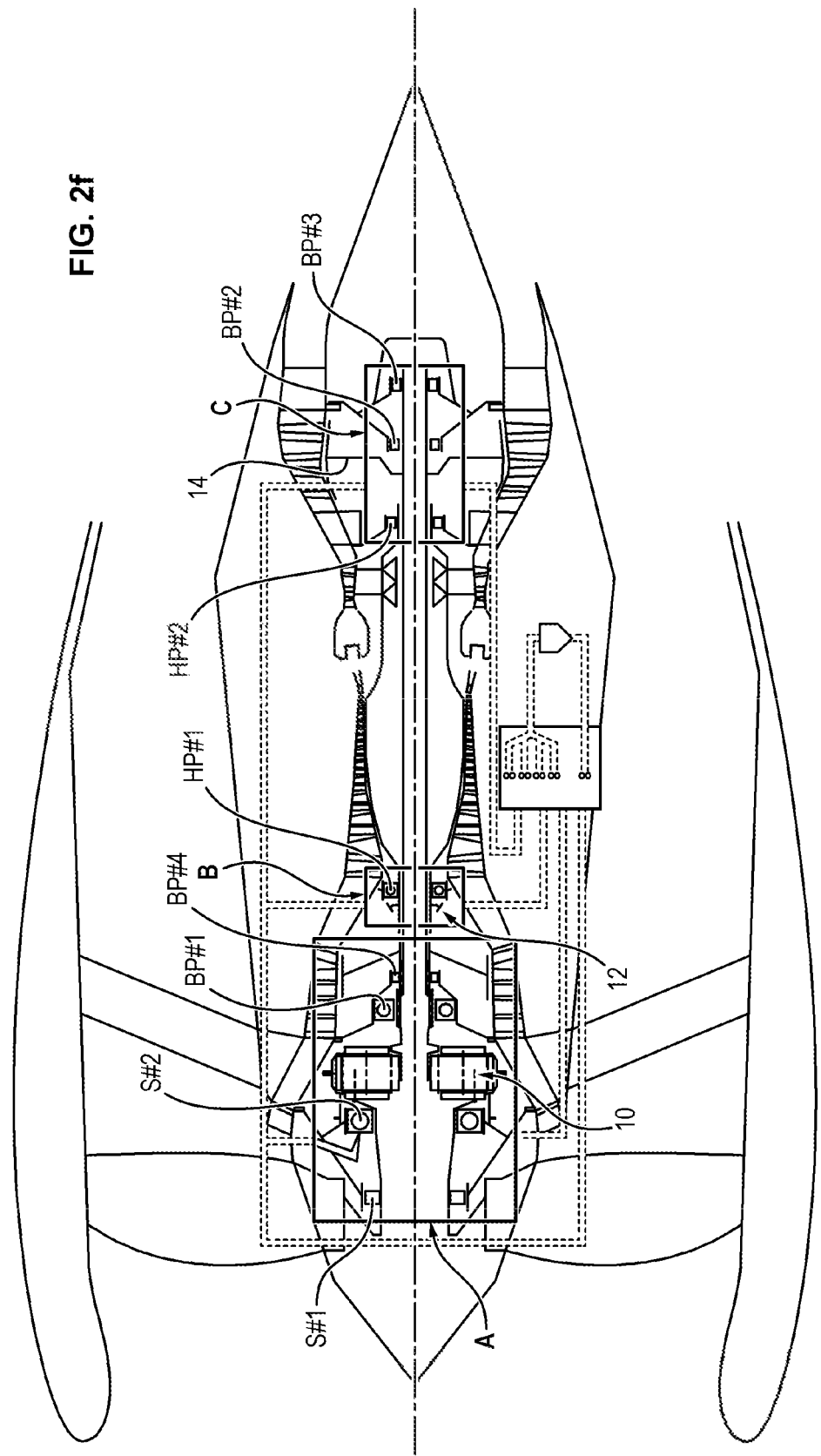

The embodiments illustrated in FIGS. 2d to 2f are identical to those illustrated in FIGS. 2a to 2c respectively, except that the low-pressure bearing BP#4 is supported by the input casing (as for the low-pressure bearing BP#1), that is, by the casing which extends between the fan 2 and the booster 3a. It is evident that irrespective of the embodiment the low-pressure bearing BP#4 and the front high-pressure bearing HP#1 can be housed either in the same enclosure B (as illustrated and described hereinabove), or in separate enclosures (not shown in the figures). In the case of separate enclosures, either one recovery pump is associated with each enclosure or a single recovery pump is used to recover oil injected into the two enclosures.

In the embodiment illustrated in FIG. 2a, the turbofan 1 comprises at most four recovery pumps 28a to 28d, each recovery pump 28a to 28d being associated with at least an enclosure A to D, specifically:
  an enclosure A housing the two fan bearings S#1 and S#2, the reduction mechanism 10 and the low-pressure bearings BP#1 and BP#4.
  an enclosure B housing the front high-pressure bearing HP#1.

an enclosure C housing the rear high-pressure bearing HP#2.

an enclosure D housing the low-pressure bearings BP#2 and BP#3.

This exemplary embodiment is therefore identical to that illustrated in FIG. 1b, except that the low-pressure bearing BP#4 is placed in the enclosure A rather than in the enclosure B.

Here too, the turbofan 1 could comprise exactly three recovery pumps, the recovery pump 28c being configured to recover oil in the enclosure C which houses the rear high-pressure bearing HP#2 and in the enclosure D which houses the low-pressure bearings BP#2 and BP#3. In this case, the recovery pump 28d is omitted.

The exemplary embodiment illustrated in FIG. 2b is identical to that illustrated in FIG. 2a, except that the low-pressure bearing BP#2 is placed in the enclosure C. As for FIG. 2a, the same recovery pump 28c can be used for recovering oil in the enclosures C and D, the turbofan 1 comprising three recovery pumps 28a to 28c only.

The exemplary embodiment illustrated in FIG. 2c is identical to that illustrated in FIG. 2a, except that the turbofan 1 comprises only the enclosures A, B and C, the enclosure C housing the rear high-pressure bearing HP#2 and the low-pressure bearings BP#2 and BP#3. In this exemplary embodiment, the turbofan 1 therefore comprises three recovery pumps 28a, 28b and 28c exactly, specifically one recovery pump 28a to 28c per enclosure A to C (respectively).

Figure 3B:
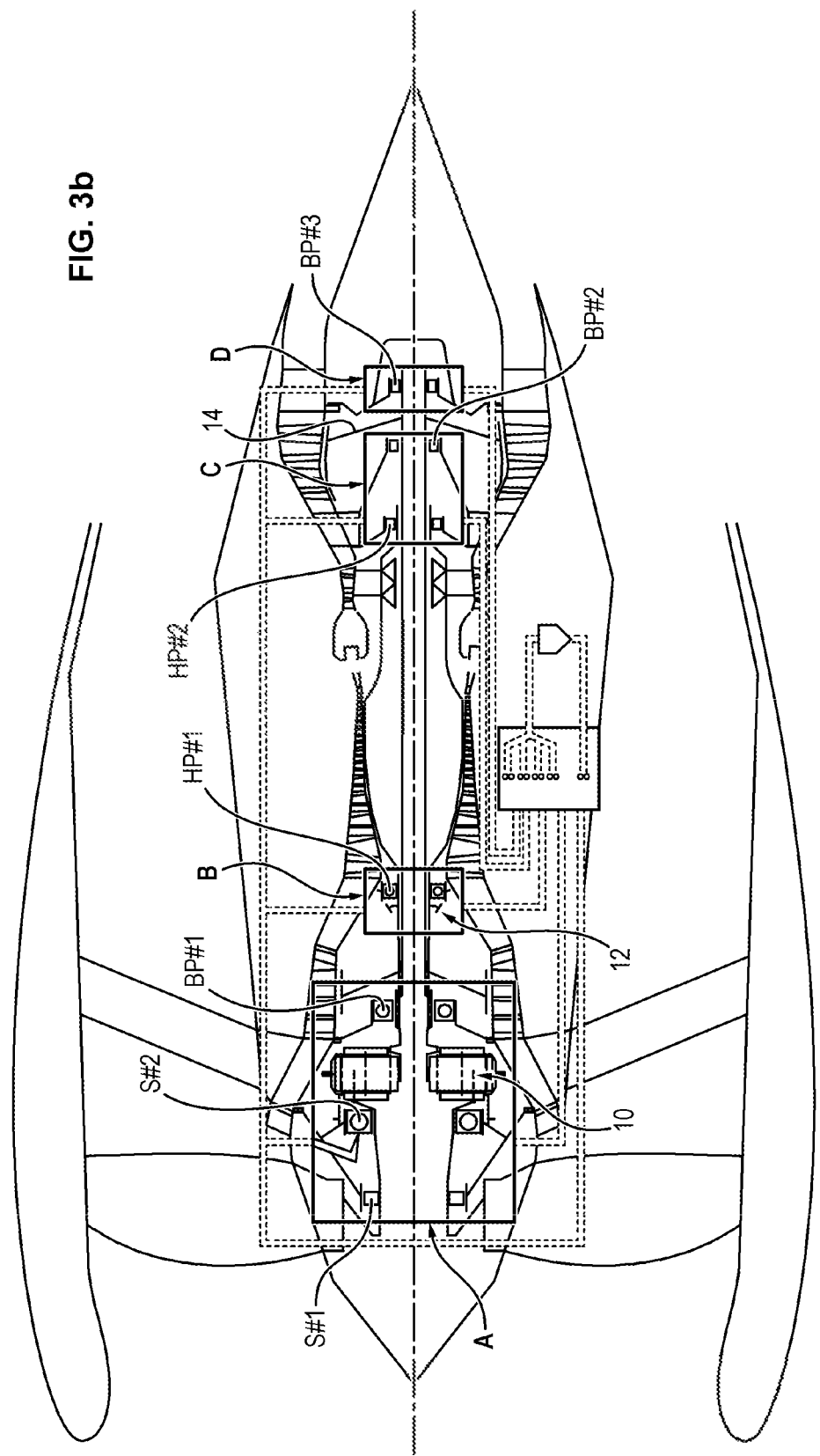
Figure 3C:
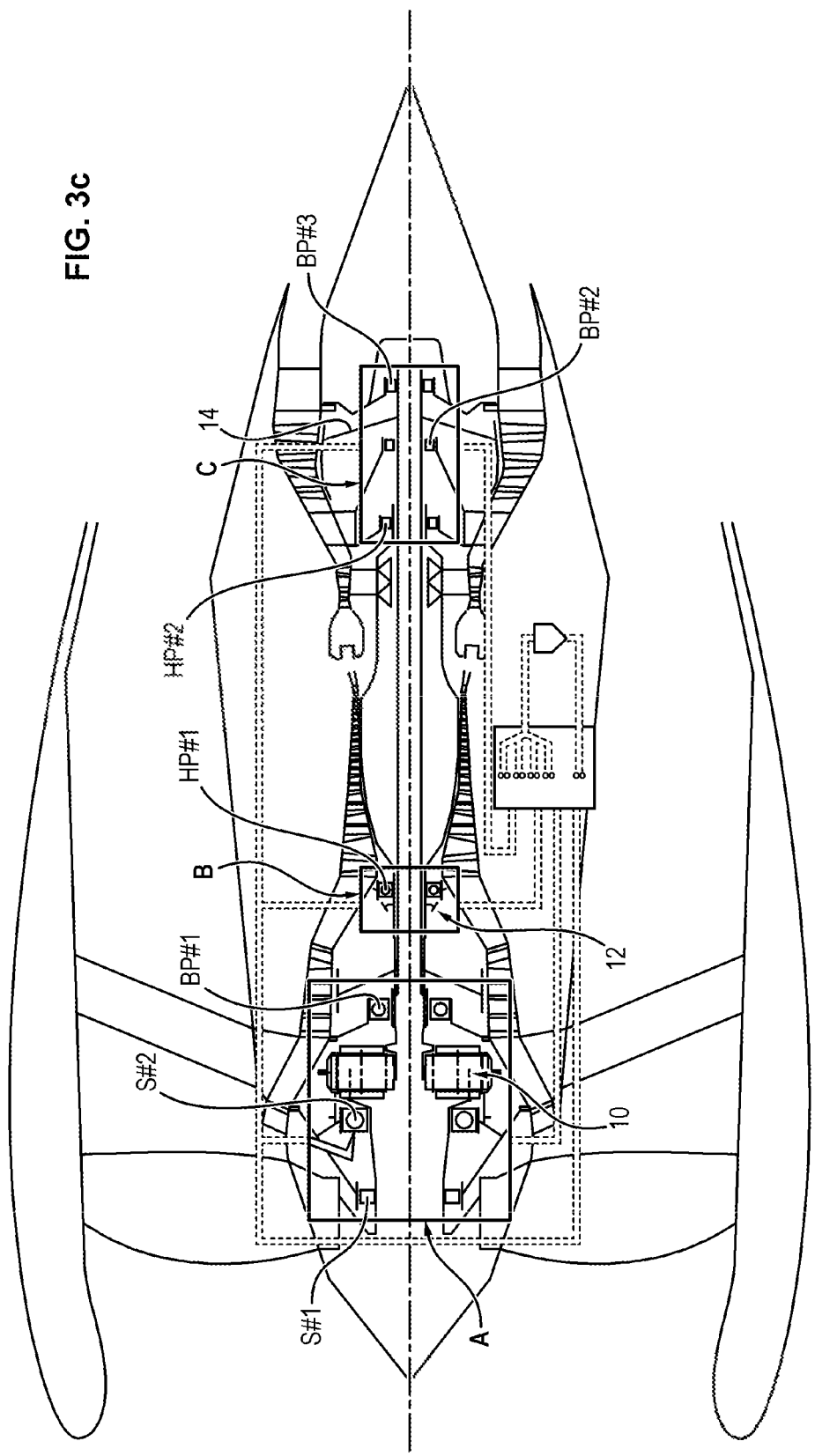
Figure 3D:
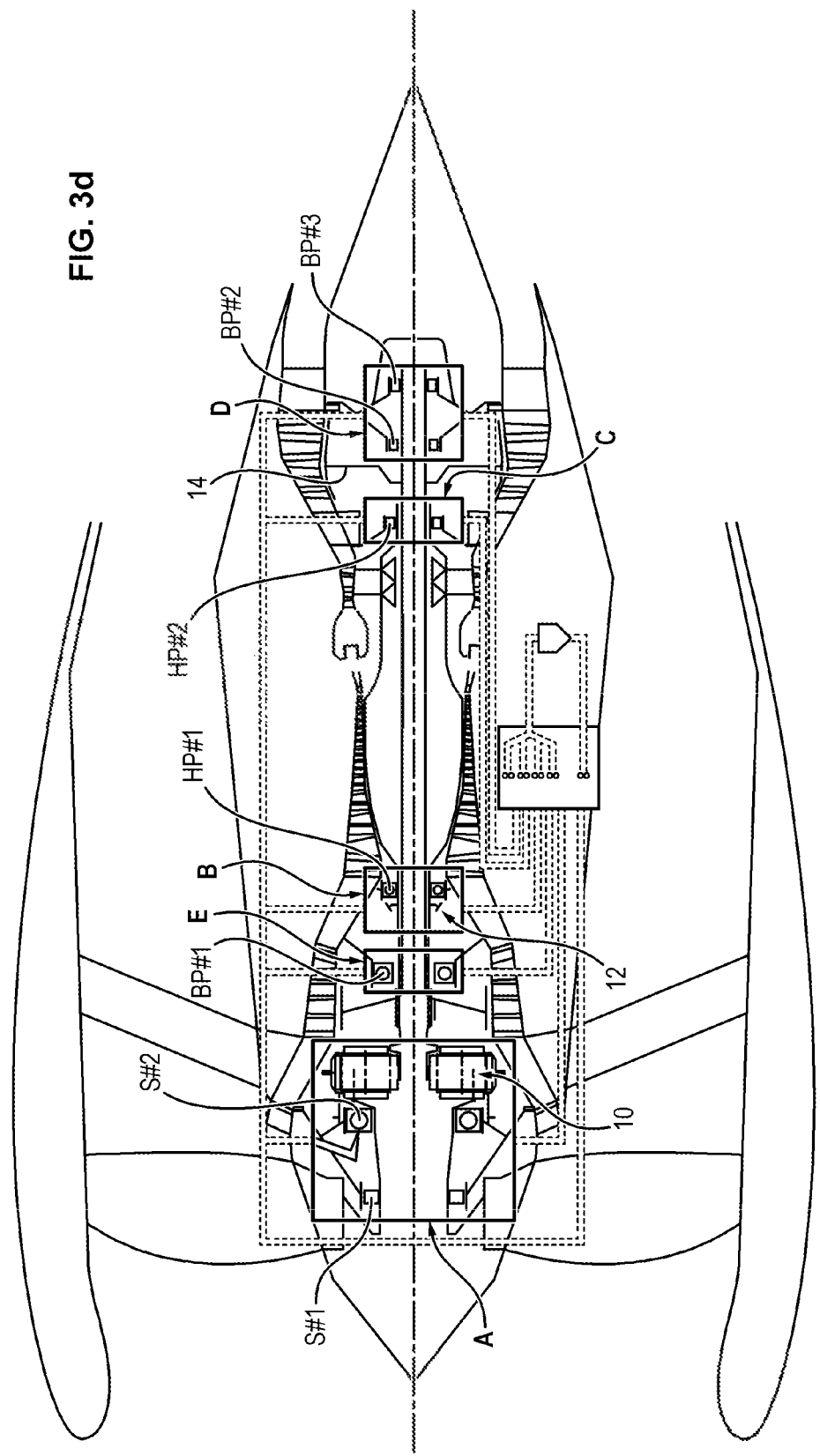
Figure 3F:
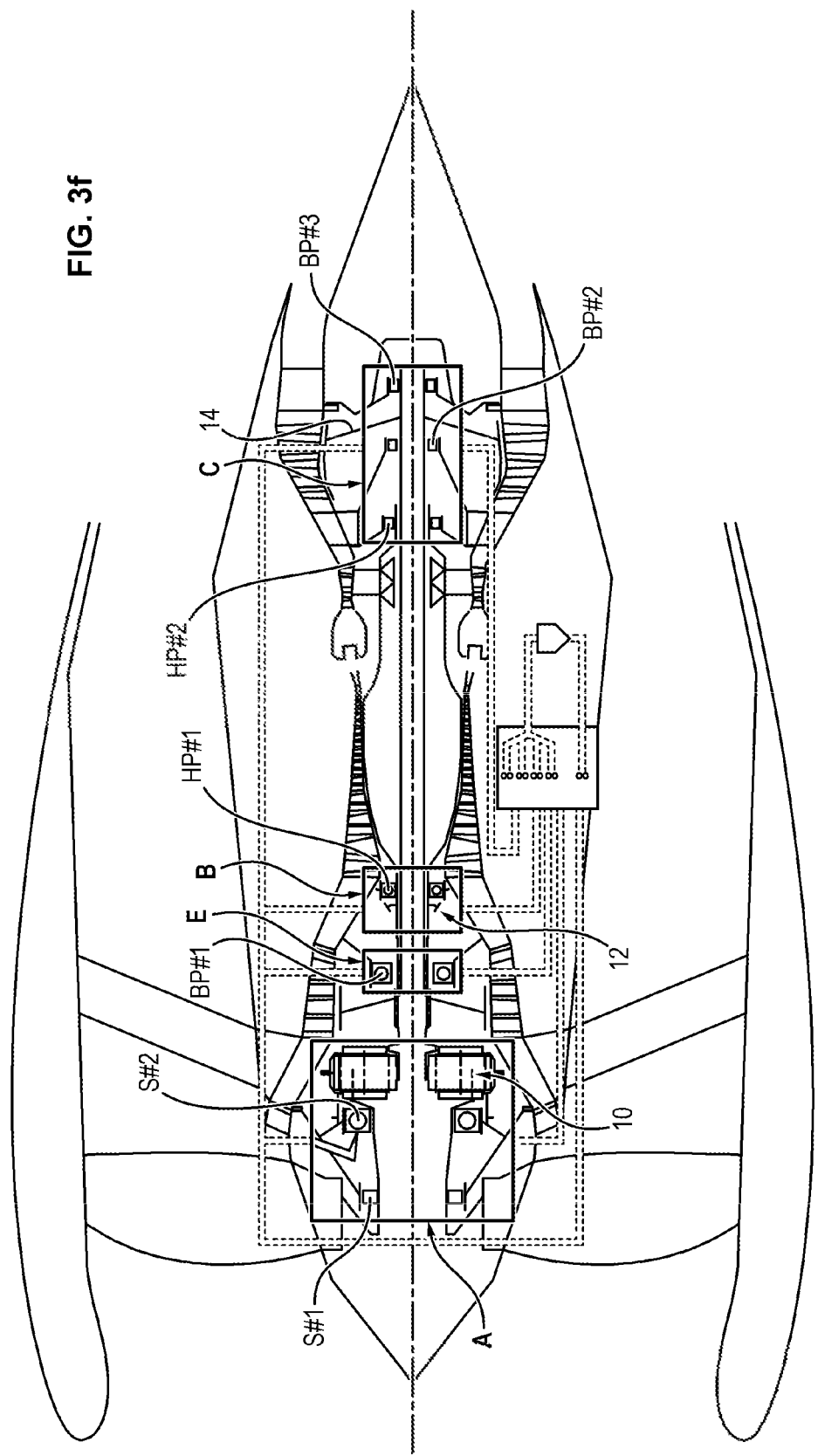

The exemplary embodiments illustrated in FIGS. 3d to 3f are identical to those illustrated in FIGS. 3a to 3c respectively, except that the low-pressure bearing BP#1 is not placed in the enclosure A, but in a separate enclosure E, upstream of the enclosure B of the front high-pressure bearing HP#1.

Figure 3I:
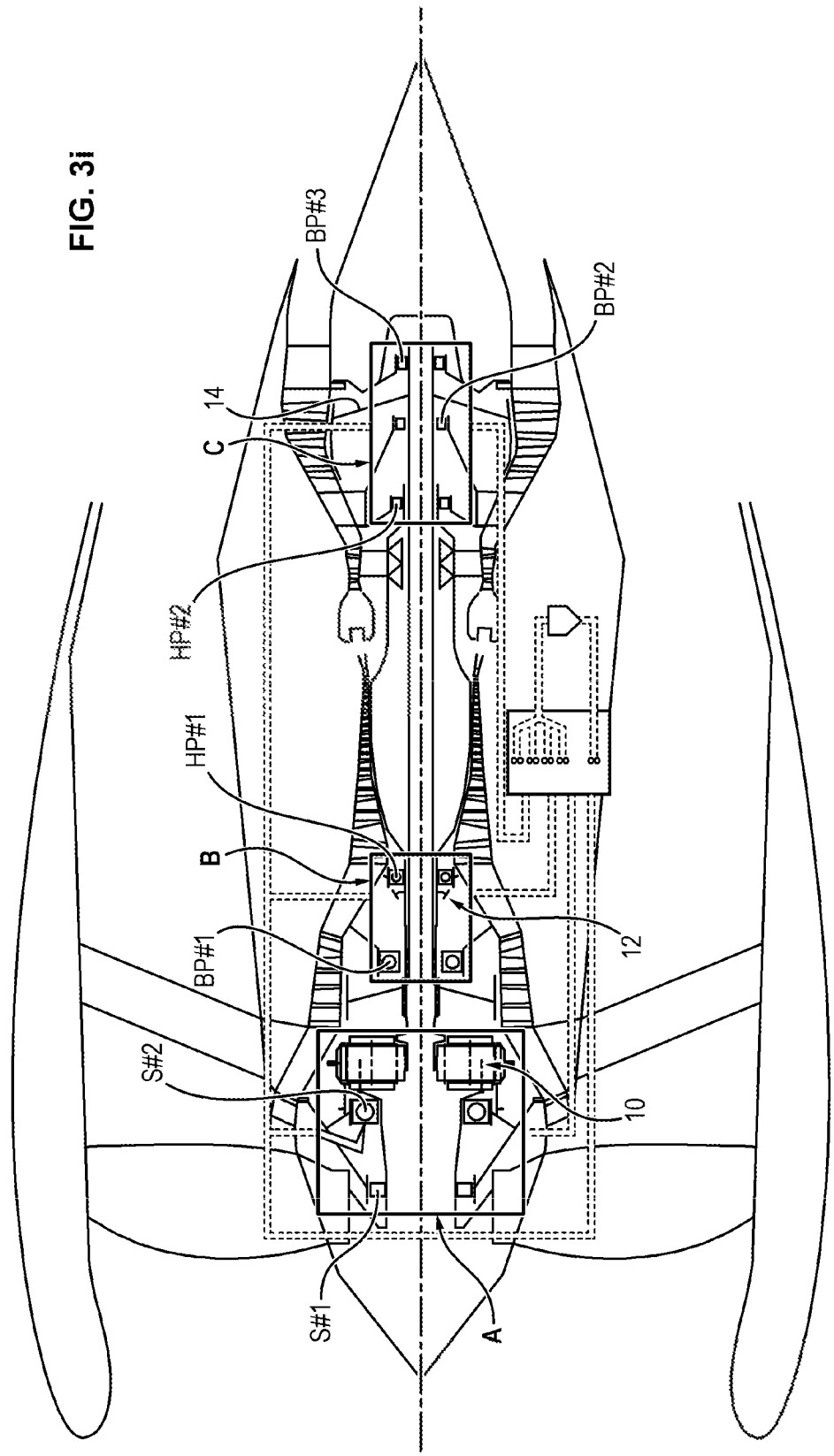

The exemplary embodiments illustrated in FIGS. 3g to 3i are identical to those illustrated in FIGS. 3a to 3c respectively, except that the low-pressure bearing BP#1 this time is placed in the same enclosure B as the front high-pressure bearing HP#1, and no longer in the front enclosure A or in a dedicated enclosure.

In an exemplary embodiment not illustrated in figures, the turbofan 1 comprises five enclosures. A first enclosure A houses the two fan bearings S#1 and S#2, the reduction mechanism 10, the low-pressure bearing BP#1 and the fourth low-pressure bearing BP#4, A second enclosure B houses the front high-pressure bearing HP#1. A third, a fourth and a fifth enclosure respectively house the rear high-pressure bearing HP#2, the second low-pressure bearing BP#2 and the third low-pressure bearing BP#3. In this case, the turbofan 1 comprises at most five recovery pumps (specifically at, most one pump per enclosure). In this way, the turbofan 1 can comprise a recovery pump for the first enclosure, a recovery pump for the second enclosure, and between one and three recovery pumps for the third, the fourth and the fifth enclosure.

In the exemplary embodiments illustrated in FIGS. 3a to 3c, the turbofan 1 comprises two fan bearings S#1 and S#2, a reduction mechanism 10, two high-pressure bearings HP#1 and HP#2 and three low-pressure bearings BP#1, BP#2 and BP#3.

In the exemplary embodiment illustrated in FIG. 3a, the turbofan 1 comprises at most four recovery pumps 28a to 28d, each recovery pump 28a to 28d being associated with at least an enclosure A to D, specifically four enclosures A to D:

an enclosure A housing the two fan bearings S#1 and S#2 the reduction mechanism 10 and the low-pressure bearing BP#1, an enclosure B housing the front high-pressure bearing HP#1.

an enclosure C housing the rear high-pressure bearing HP#2.

an enclosure D housing the low-pressure bearings BP#2 and BP#3.

Here too, the turbofan 1 could comprise exactly three recovery pumps, the recovery pump 28c being configured to recover oil in the enclosure C which houses the rear high-pressure bearing HP#2 and in the enclosure D which houses the low-pressure bearings BP#2 and BP#3. In this case, the recovery pump 28d is omitted.

The exemplary embodiment illustrated in FIG. 3b is identical to that illustrated in FIG. 1a, except that the low-pressure bearing BP#2 is placed in the enclosure C. As for FIG. 3a, the same recovery pump 28c can be used for recovering oil in the enclosures C and 0, the turbofan 1 comprising three recovery pumps 28a to 28c only. The exemplary embodiment illustrated in FIG. 3c is identical to that illustrated in FIG. 3a, except that the turbofan 1 comprises the enclosures A, B and C only, the enclosure C housing the rear high-pressure bearing HP#2 and the low-pressure bearings BP#2 and BP#3. In this exemplary embodiment, the turbofan 1 therefore comprises three recovery pumps 28a, 28b and 28c exactly, specifically one recovery pump 28a to 28c per enclosure A to C (respectively).

In an exemplary embodiment not illustrated in the figures, the turbofan 1 comprises five enclosures. A first enclosure A houses the two fan bearings S#1 and S#2, the reduction mechanism 10 and the low-pressure bearing BP#1. A second enclosure B houses the front high-pressure bearing HP#1. A third, a fourth and a fifth enclosure respectively house the rear high-pressure bearing HP#2, the second low-pressure bearing BP#2 and the third low-pressure bearing BP#3. In this case, the turbofan 1 comprises at most five recovery pumps (specifically at most a pump by enclosure), In this way, the turbofan 1 can comprise a recovery pump for the first enclosure, a recovery, pump for the second enclosure, and between one and three recovery pumps for the third, the fourth and the fifth enclosure.

It is evident in general that when the second and the third low-pressure bearing BP#2 and BP#3 are housed in the same enclosure (as illustrated for example in FIG. 1a, but also in the embodiments of FIGS. 2a, 2d, 3a, 3d and 3g), the second bearing BP#2 is preferably attached to the exhaust casing. Also, when the second low-pressure bearing BP#2 and the rear high-pressure bearing HP#2 are housed in the same enclosure (as illustrated for example in FIGS. 1b, 2b, 2e 3b, 3e and 3h), the second bearing BP#2 is preferably attached to the inter-turbine casing. However, when the second low-pressure bearing BP#2, the third low-pressure bearing BP#3 and the rear bearing HP#2 of the high-pressure shaft are housed in the same enclosure or in three separate enclosures, the second bearing BP#2 can be attached either on the exhaust casing (as illustrated in FIGS. 1c, 2c, 2f) or on the inter-turbine casing (as illustrated in FIGS. 3c, 3f and 3i).

Optionally, the low-pressure shaft is further connected to the low-pressure turbine by a link 14. This link is preferably attached between two enclosures and so as not to intersect with the link between a bearing (for example BP#2) and the low-pressure shaft. In this way, in the case of FIGS. 1a, 2a, 2d, 3a, 3d and 3g where the second low-pressure bearing BP#2 is housed in the same enclosure as the third low-pressure bearing BP#3, the link 14 extends between the rear high-pressure bearing HP#2 and the second low-pressure bearing BP#2; whereas in the case of FIGS. 1*b*, 2*b*, 2*e*, 3*b*, 3*e* and 3*h* where the second low-pressure bearing BP#2 is housed in the same enclosure as the rear high-pressure bearing HP#2, the link 14 extends between the second low-pressure bearing BP#2 and the third low-pressure bearing BP#3.

Optionally, irrespective of the embodiment, the enclosure which houses the front bearing HP#1 can also house the gear 12 configured to draw the power on the high-pressure shaft. This configuration shares the recovery pump of the front bearing HP#1 and of the gear in question.

Also, irrespective of the embodiment, the turbofan 1 comprises no second low-pressure bearing BP#2 or third low-pressure bearing BP#3. In this case, the rear high-pressure bearing HP#2 and the remaining bearing (third low-pressure bearing BP#3 or second low-pressure bearing BP#2) are housed either in separate enclosures, or in the same enclosure. The number of recovery pumps associated with the rear high-pressure bearing HP#2 and the remaining bearing (BP#3 or BP#2) is equal to one or two.

When the high-pressure shaft 7*a* is supported by a single front bearing HP#1 only, the bearing HP#1 preferably comprises a ball bearing. As a variant, the high-pressure shaft 7*a* can further comprise a third high-pressure bearing (not shown in the figures), placed between the front bearing HP#1 and the rear bearing HP#2. The third high-pressure bearing is preferably placed near the front bearing HP#1. In this case, irrespective of the embodiment (including those illustrated in FIGS. 1*a* to 3*i*), the third high-pressure bearing is housed in the enclosure B, with the front high-pressure bearing HP#1.

Optionally, the second bearing BP#2 can be omitted.

The enclosures A to D can be vented or non-vented.

By non-vented enclosure is meant here an enclosure which is not directly in fluid communication with the open air and which does not comprise a degassing tube. To this end, an oil recovery pump connected to a recovery port can be placed in a low point of the engine so as to recovery the oil and the air of the non-vented enclosure and thus create an aspiration of air through the seals of the enclosure. The pump advantageously has a pumping flow rate greater than that of the incoming oil supply in the enclosure allowing lubrication of the bearing(s) and if necessary of the reduction mechanism 10. In this case, it is preferably to have an airflow through the two seals, upstream and downstream, so as to retain the oil at the two seals. Moreover, so that there are flows of air passing through the two seals of the oil enclosure, it is preferable that the pressure upstream of the two seals be substantially equal in order to avoid the formation of a preferred channel of the air flow which would compromise the sealing performance of one of the seals.

By vented enclosure is meant here an enclosure capable of being in communication with the open air while being held at a pressure close to atmospheric pressure. The bearings at the interior of such enclosures are bathed by the oil fog which is extracted from the enclosure continuously by a degassing tube, the air and the oil then being separated in an oil separator. In such an enclosure, the recovery pump has a pumping flow rate substantially equal to that of the incoming oil supply into the enclosure (via the spray nozzles). Furthermore, it is possible to have flows of air passing through the upstream and downs ream seals of the enclosure, said flows of air having a pressure greater than or equal to that prevailing in the enclosure.

In one embodiment, when the enclosure comprises at most two seals, the enclosure is preferably non-vented. Likewise, when the enclosure comprises more than two seals, the enclosure is preferably vented.

Typically, regardless of the embodiment, the enclosure A is preferably vented to the extent that it comprises systematically a first seal corresponding to the interface between the fan 2 rotor and the fan 2 casing (the enclosure A housing the fan bearings S#1 and S#2), a B second interface between the fan shaft 2*a* and the low-pressure shaft 6 (enclosure A housing the reduction mechanism 10) and a third interface between the low-pressure shaft 6 and the inter-compressor casing (the enclosure A housing the low-pressure bearing BP#1). This enclosure A therefore necessarily comprises a dedicated recovery pump.

In the event where the rear bearings HP#2, BP#2 and BP#3 are each housed in a respective enclosure, said enclosures can therefore be non-vented. Furthermore, for these enclosures and as described with reference to the figures above, the recovery pumps can (optionally) be shared, i.e. the lubrication assembly comprises at most three recovery pumps for recovering oil in these three enclosures, preferably exactly two recovery pumps, or even a single recovery pump.

However, in the exemplary embodiments illustrated in FIG. 1*c*, 2*c*, 2*f*, 3*c*, 3*f* and 3*i*, the rear bearings HP#2, BP#2 and BP#3 are all three housed in the same single enclosure C, which is therefore preferable vented. In this case, a recovery pump is associated with this enclosure C.

When the front high-pressure bearing HP#1 is the only one in its enclosure B (or associated with the gear 12 only), the enclosure B can be non-vented. When its enclosure comprises further the gear 12, the enclosure can be vented or non-vented. The recovery pump associated with this non-vented enclosure can be shared with another non-vented enclosure.

Similarly, when the rear high-pressure bearing HP#2 is the only one in its enclosure, the enclosure can be non-vented. The recovery pump associated with this non-vented enclosure can be shared with another non-vented enclosure.

When the rear high-pressure bearing HP#2 is housed in the same enclosure as the second low-pressure bearing BP#2 (but in a different enclosure of the third low-pressure bearing BP#3); said enclosure can be vented or non-vented.

The fan bearing S#1 can be of the roller bearing type and can comprise an inner ring and an outer ring coaxial between which rollers are mounted. Also, the fan bearing S#2 can be of the ball bearing type and comprise an inner ring and an outer ring coaxial between which balls are mounted.

By way of dampen on, in the prior art, the front fan bearing S#1 and the rear fan bearing S#2 each comprise a conical roller bearing, which are dynamically comparable to a single bearing. By opposition, the implementation of a roller bearing and of a ball bearing for the front fan bearing and the rear fan bearing respectively thus allows having two "real ones," thus allowing more accurate guidance in rotation.

The low-pressure bearing BP#1 can be of the ball bearing type and comprise a coaxial inner ring and outer ring between which the balls are mounted.

The low-pressure bearings BP#2, BP#3 and if necessary BP#4 can be of the roller bearing type.

Finally, the front HP#1 and rear HP#2 high-pressure bearings can be of the roller bearing type.

The invention claimed is:

1. A bypass turbofan comprising:
a low-pressure shaft supported by at least two low-pressure bearings,
a high-pressure shaft supported by at least two high-pressure bearings,
wherein at least two high-pressure bearings comprise two front high-pressure bearings and a rear high-pressure bearing, wherein the two front high-pressure bearings are placed upstream of a combustion chamber and the rear high-pressure bearing is placed downstream of the combustion chamber,
a fan shaft supported by at least two fan bearings,
a reduction mechanism, coupling the low-pressure shaft and the fan shaft,
enclosures housing at least two low-pressure bearings, at least two high-pressure bearings, at least two fan bearings and the reduction mechanism, and
a lubrication assembly comprising a closed oil circuit configured to supply the enclosures with oil to cool at least two low-pressure bearings, at least two high-pressure bearings, at least two fan bearings and the reduction mechanism,
wherein the lubrication assembly comprises at most five recovery pumps configured to recover oil in the enclosures, and
wherein the two front high-pressure bearings are housed in a same enclosure of the enclosures and associated with a same recovery pump of at most five recovery pumps.

2. The turbofan according to claim 1, wherein the lubrication assembly comprises at most four recovery pumps.

3. The turbofan according to claim 1, said turbofan comprising at most as many recovery pumps as enclosures, each recovery pump being associated with at most one respective enclosure.

4. The turbofan according to claim 1, wherein the at least two fan bearings, the reduction mechanism and at least one of the at least two low-pressure bearings are housed in an enclosure of the enclosures, and wherein a single recovery pump is configured to recover oil injected into the enclosure of the enclosures.

5. The turbofan according to claim 1, wherein the enclosures comprise at most four enclosures,
wherein one of the at least two low-pressure bearings, the at least two high-pressure bearings and the at least two fan bearings are housed in the at most four enclosures, and
wherein the lubrication assembly comprises exactly three or four recovery pumps configured to recover oil injected into the at most four enclosures.

6. The turbofan according to claim 1, wherein the at least two low-pressure bearings comprise exactly three or four low-pressure bearings, wherein exactly three or four low-pressure bearings include one or two low-pressure bearings placed upstream of a combustion chamber and one or two low-pressure bearings placed downstream of the combustion chamber.

7. The turbofan according to claim 1, having a bypass ratio greater than or equal to 10.

8. The turbofan according to claim 1, wherein the reduction mechanism comprises a star or planetary gear reduction mechanism having a reduction ratio between 2.6 and 5.

9. The turbofan according to claim 1, having a bypass ratio greater than or equal to 18.

10. The turbofan according to claim 1, having a bypass ratio between 12 and 18.

11. A bypass turbofan comprising:
a low-pressure shaft supported by at least two low-pressure bearings, wherein at least two low-pressure bearings comprise a first low-pressure bearing, a second low-pressure bearing and a third low-pressure bearing,
a high-pressure shaft supported by at least two high-pressure bearings, wherein at least two high-pressure bearings comprise a front high-pressure bearing and a rear high-pressure bearing
a fan shaft supported by at least two fan bearings,
a reduction mechanism, coupling the low-pressure shaft and the fan shaft,
enclosures housing the at least two low-pressure bearings, the at least two high-pressure bearings and the at least two fan bearings and the reduction mechanism, and
a lubrication assembly comprising a closed oil circuit configured to supply the enclosures with oil to cool the at least two low-pressure bearings, the at least two high-pressure bearings and the at least two fan bearings and the reduction mechanism,
wherein the lubrication assembly comprises at most five recovery pumps configured to recover oil in the enclosures,
wherein the enclosures comprise an enclosure housing the rear high-pressure bearing, an enclosure housing the third low-pressure bearing and an enclosure housing the fourth low-pressure bearing which are non-vented.

12. The turbofan according to claim 11, having a bypass ratio greater than or equal to 10.

13. The turbofan according to claim 11, wherein the reduction mechanism comprises a star or planetary gear reduction mechanism having a reduction ratio between 2.6 and 5.

14. The turbofan according to claim 11, having a bypass ratio greater than or equal to 18.

15. The turbofan according to claim 11, having a bypass ratio between 12 and 18.

16. The turbofan according to claim 11, wherein the first low-pressure bearing is placed upstream of a combustion chamber, and the second low-pressure bearing and the third low-pressure are placed downstream of the combustion chamber.

17. The turbofan according to claim 12, wherein the at least two low-pressure bearings further comprise a fourth low-pressure bearing placed upstream of the combustion chamber.

18. The turbofan according to claim 12, wherein the at least two fan bearings, the reduction mechanism and the fourth low-pressure bearing are housed in an enclosure of the enclosures, and wherein a single recovery pump is configured to recover oil injected into the enclosure of the enclosures.

19. The turbofan according to claim 11, said turbofan comprising at most as many recovery pumps as enclosures, each recovery pump being associated with at most one respective enclosure.

20. The turbofan according to claim 11, wherein the enclosures comprise at most four enclosures,
wherein one of the at least two low-pressure bearings, the at least two high-pressure bearings and the at least two fan bearings are housed in the enclosures, and
wherein the lubrication assembly comprises exactly three or four recovery pumps configured to recover oil injected into the enclosures.

* * * * *